United States Patent
Gottlob et al.

(10) Patent No.: US 11,734,365 B1
(45) Date of Patent: Aug. 22, 2023

(54) KNOWLEDGE-ENRICHED ITEM SET EXPANSION SYSTEM AND METHOD

(71) Applicant: Unlimidata Limited, London (GB)

(72) Inventors: Georg Gottlob, Oxford (GB); Jinsong Guo, London (GB)

(73) Assignee: Unlimidata Limited

( * ) Notice: Subject to any disclaimer, the term of this patent is extended or adjusted under 35 U.S.C. 154(b) by 0 days.

(21) Appl. No.: 18/114,699

(22) Filed: Feb. 27, 2023

Related U.S. Application Data

(60) Provisional application No. 63/314,519, filed on Feb. 28, 2022.

(51) Int. Cl.
  *G06F 16/93* (2019.01)
  *G06F 16/906* (2019.01)
  *G06F 16/903* (2019.01)
(52) U.S. Cl.
  CPC ............ *G06F 16/93* (2019.01); *G06F 16/903* (2019.01); *G06F 16/906* (2019.01)
(58) Field of Classification Search
  CPC ...... G06F 16/93; G06F 16/906; G06F 16/903; G06F 40/295; G06N 5/022; G06N 5/04
  See application file for complete search history.

(56) References Cited

U.S. PATENT DOCUMENTS

| | | | |
|---|---|---|---|
| 7,350,187 | B1 | 3/2008 | Tong |
| 9,268,821 | B2 | 2/2016 | Hagiwara |
| 9,477,758 | B1 | 10/2016 | Tong |
| 10,013,413 | B2 | 7/2018 | Otero |
| 10,860,791 | B2 | 12/2020 | Canton |

FOREIGN PATENT DOCUMENTS

AU   2014290354 b2   1/2015

OTHER PUBLICATIONS

Sarmento et al., ""More like these": Growing entity classes from seeds," Proceedings of the sixteenth ACM conference on Conference on information and knowledge management, Nov. 2007, pp. 959-962.

(Continued)

*Primary Examiner* — Hau H Hoang
(74) *Attorney, Agent, or Firm* — Fresh IP PLC; Clifford D. Hyra; John R. Bednarz

(57) ABSTRACT

A computer-implemented method and a corresponding system for expanding an initially given input list of items from an application domain by similar or related items. The method operates on a computer-retrievable document repository containing a plurality of electronic documents. The method computes an expanded list of items from the initially given seed list by combining (i) methods for extracting candidate items that co-occur with already established items in selected lists contained in documents retrieved from said document store with (ii) knowledge-based inference tasks involving domain-specific logical facts and, in some embodiments also at least one domain-specific logical rule related to said application domain. By this combination, an improved item set expansion is obtained, which takes the particularities of the application domain into account, and which leads to a list expansion that may better fit a user's expectation.

30 Claims, 9 Drawing Sheets

(56) References Cited

OTHER PUBLICATIONS

Thelen et al., "A Bootstrapping Method for Learning Semantic Lexicons using Extraction Pattern Contexts," Proceedings of the Conference on Empirical Methods in Natural Language Processing (EMNLP), Philadelphia, Jul. 2002, pp. 214-221.

Talukdar et al., "A Context Pattern Induction Method for Named Entity Extraction," Proceedings of the Tenth Conference on Computational Natural Language Learning, New York City, Jun. 2006, pp. 141-148.

Metzger et al., "Aspect-based Similar Entity Search in Semantic Knowledge Graphs with Diversity-awareness and Relaxation," 2014 IEEE/WIC/ACM International Joint Conferences on Web Intelligence and Intelligent Agent Technologies, Warsaw, Poland, Aug. 2014.

Kushilevitz et al., "A Two-Stage Masked LM Method for Term Set Expansion," Proceedings of the 58th Annual Meeting of the Association for Computational Linguistics, Jul. 2020, pp. 6829-6835.

Wang et al., "Automatic Set Instance Extraction using the Web," Proceedings of the Joint Conference of the 47th Annual Meeting of the ACL and the 4th International Joint Conference on Natural Language Processing of the AFNLP, Suntec, Singapore, Aug. 2009, pp. 441-449.

Yu et al., "Corpus-based Set Expansion with Lexical Features and Distributed Representations," Proceedings of the 42nd International ACM SIGIR Conference on Research and Development in Information Retrieval, Jul. 2019, pp. 1153-1156.

Li et al., "Distributional Similarity vs. PU Learning for Entity Set Expansion," Proceedings of the ACL 2010 Conference, Jul. 2010, pp. 359-364.

Mohapatra et al., "Domain Knowledge Driven Key Term Extraction for IT Services," International Conference on Service Oriented Computing, Nov. 2018.

Rong et al., "EgoSet: Exploiting Word Ego-networks and User-generated Ontology for Multifaceted Set Expansion," Proceedings of the Ninth ACM International Conference on Web Search and Data Mining, Feb. 2016, pp. 645-654.

Zhang et al., "Empower Entity Set Expansion via Language Model Probing," Proceedings of the 58th Annual Meeting of the Association for Computational Linguistics, Jul. 2020, pp. 8151-8160.

Yan et al., "End-to-End Bootstrapping Neural Network for Entity Set Expansion," Proceedings of the AAAI Conference on Artificial Intelligence, 34, 2020, pp. 9402-9409.

Zhang et al., "Entity set expansion in opinion documents," Proceedings of the 22nd ACM Conference on Hypertext and Hypermedia, Eindhoven, The Netherlands, Jun. 2011, pp. 281-290.

Adrian et al., "Entity Set Expansion from the Web via ASP," Technical Communications of the 33rd International Conference on Logic Programming, Jan. 2017.

Zhang et al., "Entity Set Expansion via Knowledge Graphs," Proceedings of the 40th International ACM SIGIR Conference on Research and Development in Information Retrieval, Aug. 2017, pp. 1101-1104.

Zheng et al., "Entity Set Expansion with Meta Path in Knowledge Graph," IEEE Transactions on Big Data, Jun. 2022, vol. 8 Issue 3, pp. 616-629.

Chen et al., "Entity set expansion with semantic features of knowledge graphs," Journal of Web Semantics, Oct. 2018, vols. 52-53, pp. 33-44.

Bron et al., "Example Based Entity Search in the Web of Data," Proceedings of the 35th European conference on Advances in Information Retrieval, Mar. 2013, pp. 392-403.

Zhu et al., "FUSE: Multi-Faceted Set Expansion by Coherent Clustering of Skip-grams," Machine Learning and Knowledge Discovery in Databases: European Conference, Sep. 2020, pp. 617-632.

Yang, "Fuzzy Covering-Based Three-Way Clustering," Mathematical Problems in Engineering, Jul. 2020.

Garcia et al., "Generating Semantic Snapshots of Newscasts Using Entity Expansion," Proceedings of the 15th International Conference on Engineering the Web in the Big Data Era, Jun. 2015, pp. 410-419.

Wang et al., "Iterative Set Expansion of Named Entities using the Web," 2008 Eighth IEEE International Conference on Data Mining, Dec. 2008.

Wang et al., "Language-Independent Set Expansion of Named Entities using the Web," Seventh IEEE International Conference on Data Mining, Oct. 2007.

Jindal et al., "Learning from Negative Examples in Set-Expansion," 2011 IEEE 11th International Conference on Data Mining, Dec. 2011.

Adrian et al., "Navigating Online Semantic Resources for Entity Set Expansion," International Symposium on Practical Aspects of Declarative Languages, Jan. 2018.

Rastogi et al., "Neural variational entity set expansion for automatically populated knowledge graphs," Information Retrieval Journal, Aug. 2019.

Jacovi et al., "Scalable Evaluation and Improvement of Document Set Expansion via Neural Positive-Unlabeled Learning," Proceedings of the 16th Conference of the European Chapter of the Association for Computational Linguistics, Apr. 2021, pp. 581-592.

He et al., "SEISA: Set Expansion by Iterative Similarity Aggregation," Proceedings of the 20th international conference on World wide web, Mar. 2011, pp. 427-436.

Shen et al., "SetExpan: Corpus-Based Set Expansion via Context Feature Selection and Rank Ensemble," Computer Science, Sep. 2017.

Etzioni et al., "Unsupervised Named-Entity Extraction from the Web: An Experimental Study," Artificial Intelligence, vol. 165, Issue 1, Jun. 2005, pp. 91-134.

Vergoulis et al., "VeTo: Expert Set Expamsion in Academia," Digital Libraries for Open Knowledge: 24th International Conference on Theory and Practice of Digital Libraries, Lyon, France, Aug. 2020, pp. 48-61.

Etzioni et al., "Web-Scale Information Extraction in KnowItAll (Preliminary Results)," Proceedings of the 13th International conference on World Wide Web, May 2004, pp. 100-110.

Bing et al., "Wikipedia Entity Expansion and Attribute Extraction from the Web Using Semi-supervised Learning," Proceedings of the sixth ACM international conference on Web search and data mining, Feb. 2013, pp. 567-576.

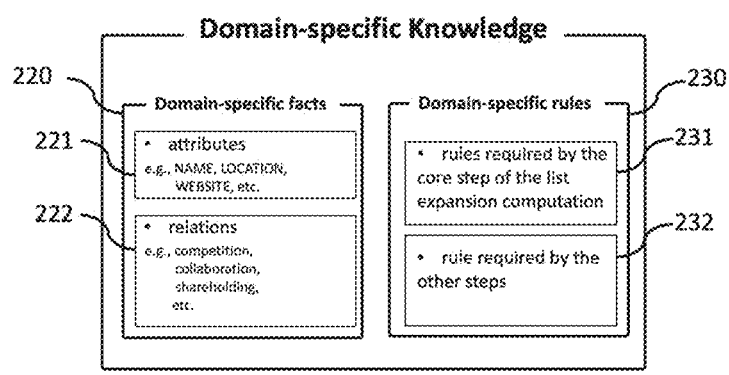
Fig. 2 domain-specific knowledge respositories

320

Example 2: a textual list

"Other alternatives include the Apple iPhone 12, Samsung Galaxy S-23, and OnePlus 7."

Example 3: a list of bullets

- Shopify
- Magento
- WooCommerce
- BigCommerce

330

Example 4: a column in a table — 340

| Major European food policy legislation and/or upcoming policies | |
|---|---|
| Company | Local currency sales (million) 2017 |
| Zoetis | $5,307 |
| Boehringer Ingelheim Animal Health | €3,361 |
| Merck/MSD Animal Health | $3,875 |
| Elanco | $2,889 |
| IDEXX Laboratories | $1,832 |

Example 5: a reference list — 350

8. REFERENCES
[1] R. Baumgartner, S. Flesca, and G. Gottlob. Visual Web Information Extraction with Lixto. In *VLDB*, pages 119–128, 2001.
[2] M. Bronzi, V. Crescenzi, P. Merialdo, and P. Papotti. Extraction and integration of partially overlapping web sources. *Proc. VLDB Endow.*, 6(10):805–816, Aug. 2013.
[3] S. L. Chuang, K. C. C. Chang, and C. Zhai. Collaborative wrapping: A turbo framework for web data extraction. In *Data Engineering, 2007. ICDE 2007. IEEE 23rd International Conference on*, pages 1261–1262, April 2007.

Fig. 3b

Seed Items: Apple, Sony, Bose
Candidate Items: Logitech, Marshall

KNOWLEDGE-ENRICHED ITEM SET EXPANSION SYSTEM AND METHOD

CROSS REFERENCE TO RELATED APPLICATION

This application claims priority from U.S. Application No. 63/314,519 filed on Feb. 28, 2022, entitled "KNOWLEDGE-ENRICHED ITEM SET EXPANSION," which is hereby incorporated by reference in its entirety.

FIELD

The present disclosure relates generally to identifying information related to a given set of examples, and more specifically, to expanding a list of seed items given as input by further related items.

BACKGROUND

Item set expansion, also known as "entity set expansion" or simply "set expansion" deals with methods and systems for expanding of a list (or, equivalently, a set) of items by further related items. The original list, which is input by a user is often referred to as the seed list. An item set expansion method is a method for computing further items from the seed list obtained from a (human or artificial) user and thus, for expanding the seed list with these further items. These further items are proposed to the user and are expected to be very similar or closely related to those of the seed list, via similarity or closeness relations that ideally match the user's intention.

Item set expansion is an important problem of high industrial relevance. It is used, for example, for finding products similar to products in a given list (in some applications these could then be potential alternative products), or for finding companies similar to companies in a given list. The latter can be used to identify sales leads by finding competitors of existing customers. Several firms maintain competitor knowledge graphs and sell competitor information in form of services to corporate customers. An example is Owler (see https://en.wikipedia.org/wiki/Owler#Competitive_Graph) which maintains a so called "Competitive Graph" and markets competitor information. Owler and similar companies marketing competitor information currently do not use item set expansion based on the co-occurrence of company names in lists occurring in documents, but could profit enormously from this technology.

In this disclosure, item set expansion relies on a repository of texts or documents. Here the term "document" may be interpreted to its widest extent, so, documents can be, for example, electronically stored pieces of plain text (such as books, E-mails, blog posts, social network posts, and so on) or Web pages or PDF or Word documents, or even query logs maintained by a search engine. In some contexts, even electronically stored images or image collections are regarded as documents.

In most cases, a retrievable document repository is used. For example, the document repository can be the World Wide Web (WWW) which is retrievable through a search engine. Other examples are document management systems or text database that can are retrievable by keyword search.

Many methods of item set expansion, especially those related to the present disclosure, rely on the co-occurrence of items from the seed list and/or of already computed further items with new items in lists contained in documents of the document repository. With such methods, a subset of items from the seed list or from its current expansion is chosen, and documents containing these items are retrieved and analyzed. In particular, the methods try to identify lists contained in the retrieved documents, where items from the seed list and/or of already computed further items from an expanded seed list jointly occur with new items. Such new items are then analyzed according to various criteria and by various methods, and based on this analysis a decision is made of whether or not such a co-occurring new item should be added (or appended) to the item list in expansion.

First methods and systems according to the above principle of item co-occurrence, and where the document repository is the WWW, were taught by Tong, Simon, and Dean, who were also the creators of the 'associative' item search engine Google Sets based item set expansion.

The problem of achieving a good item set expansion, i.e., one with high precision and recall, is a difficult one. It remains difficult even under the assumption that the user is sophisticated enough to chose the seed items enough narrowly, so to convey the intended restrictions, which should lead to a higher precision, and at the same time enough broadly, so not to be too stringent and thus jeopardize a reasonable recall. A main task of item expansion methods is thus to 'understand' (i.e., guess or determine) as well as possible the user intent, sometimes with help of interactive user feedback.

The problem has been widely studied based on unstructured texts and semi-structured Web pages. To 'understand' the seed list (and thus the user intent), these methods discover similarities among the seeds based on their linguistic and contextual features, such as word embeddings, i.e., the patterns in which the items appear in a given corpus, and their surrounding context within the corpus. The discovered similarities are then used to extract more candidates from the corpus. Probabilistic processes such as Bayesian models based on co-occurrence statistics of items are used to filter and sort the candidates. These methods purely rely on lexical and contextual information but not any concrete semantic attributes and relations, thus often failing to reveal the items' semantic correlations.

Most methods proposed in the literature, including Google Sets, are general, i.e., domain-independent. Many item set expansion methods mainly use probabilistic or statistical methods. A number of other item set expansion methods also use semantic resources, and 'world' knowledge graphs such as WordNet, Wikidata, BabelNet, Yago, WebIsaDatabase, and semantic networks built upon information extracted from them. Topological analysis and logic-based methods, such as and rule-based inference, evaluate the commonality of semantic correlations (links or paths) among seed entities and apply that to discover other similar entities. These methods are either affected by the deficiency (incompleteness, staleness, and noisiness) of semantic resources, or the lack an effective ranking to distinguish the importance of the common features shared among items.

Some methods are designed for specific application domains and have proved the efficacy of applying domain knowledge to the problem. However, these methods do not use human experts' domain knowledge and are therefore either not enough precise, or work well on very restricted application domains only.

Github repositories of implementations of some existing methods are listed be low.
https://github.com/jmshen1994/SetExpan
https://github.com/yzhan238/CGExpan
https://github.com/WanzhengZhu/FUSE
https://github.com/guykush/TermSetExpansion-MPB https://github.com/PxYu/entity-expansion
https://github.com/alonjacovi/document-set-expansion-pu
https://github.com/se4u/nvse
https://github.com/lingyongyan/bootstrapnet It can be observed that, notwithstanding its huge potential use, item set expansion is rarely used in practice. One of the main obstacles to a more widespread use of item set expansion is that most current methods are agnostic of specific application-domain knowledge. Conventional solutions for solving the item set expansion problem do not exploit domain-specific knowledge, They are mainly based on probabilistic methods and machine learning techniques but they do not apply rule-based inference to domain-specific knowledge. It can be thus observed that there is a need in the art for systems that combine both general and domain-specific knowledge with rule-based inference on top of a comprehensive and accurate view of entity semantics, In particular, application-domain dependent methods and systems were lacking that are able to generate new items from a seed list by combining (1) techniques based on co-occurrence of items in documents (e.g. Web pages) with (2) methods of rule-based or algorithmic knowledge processing. In addition, there is a need in the art for adding to the combination of (1) and (2) above also techniques that help to 'understand' use intent through interactions with the user. It is with respect to these and other considerations that the disclosure made herein is presented.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In one example, a method may include receiving, by at least one processor, a list of seed items belonging to a same application domain; and expanding, by the at least one processor, the list of seed items to include items that:
(i) are similar or related to seed items, and
(ii) co-occur with one or more seed items or and/or one or more already computed further items in one or more lists of items, comprising "Document Item Lists" ("DI-Lists"), each being part of an electronic document from a computer-retrievable electronic document repository, and
(iii) are selected by a process involving statistical evaluations and processing of factual knowledge and rule-based knowledge, the rule-based knowledge involving one or more rules expressing application-domain specific knowledge; the method further comprising:
(1) a knowledge base, accessible by the at least one processor, the knowledge base storing in permanent and/or non-transitory memory facts and rules, the knowledge base comprising a plurality of application-domain specific facts, and zero or more application-domain independent facts, one or more application-domain specific rules related to the application domain, and zero or more application-domain independent ("general") rules,
(2) inferring, by the at least one processor, new facts from a given set of facts using an inference engine that uses at least one rule from the knowledge base, and
(3) expressing items, relationships among items, and relationships between items and theft attributes as facts,
where
(i) the facts are represented as logical atoms and/or as relational data tuples that are interpreted by the inference engine as logical atoms, and/or as data structures in a programming language that are interpreted by the inference engine as logical atoms,
(ii) the rules represent logical inference rules having a rule body and a rule head,
(iii) all seed items have a type, known as "Input Item Type", and
(iv) the document repository comprises a search functionality which, for a given set of items searches and retrieves documents containing these items.

In another example, a system may include a computing device having a memory and at least one processor to execute instructions stored on the memory to perform operations comprising:
receiving a list of seed items belonging to a same application domain; and
expanding the list of seed items to include items that:
(i) are similar or related to seed items, and
(ii) co-occur with one or more seed items or and/or one or more already computed further items in one or more lists of items, comprising "Document Item Lists" ("DI-Lists"), each being part of an electronic document from a computer-retrievable electronic document repository, and
(iii) are selected by a process involving statistical evaluations and processing of factual knowledge and rule-based knowledge, the rule-based knowledge involving one or more rules expressing application-domain specific knowledge;
the operations further comprising:
(1) accessing a knowledge base, the knowledge base storing in permanent and/or non-transitory memory facts and rules, the knowledge base comprising a plurality of application-domain specific facts, and zero or more application-domain independent facts, one or more application-domain specific rules related to the application domain, and zero or more application-domain independent ("general") rules,
(2) inferring new facts from a given set of facts using an inference engine that uses at least one rule from the knowledge base, and
(3) expressing items, relationships among items, and relationships between items and their attributes as facts,
where
(i) the facts are represented as logical atoms and/or as relational data tuples that are interpreted by the inference engine as logical atoms, and/or as data structures in a programming language that are interpreted by the inference engine as logical atoms,
(ii) the rules represent logical inference rules having a rule body and a rule head,
(iii) all seed items have a type, known as "Input Item Type", and
(iv) the document repository comprises a search functionality which, for a given set of items searches and retrieves documents containing these items.

In another example, a non-transitory computer-readable storage medium may have instructions stored thereon that, when executed by at least one computing device cause the at least one computing device to perform operations, the operations including receiving a list of seed items belonging to a same application domain; and expanding the list of seed items to include items that:

(i) are similar or related to seed items, and
(ii) co-occur with one or more seed items or and/or one or more already computed further items in one or more lists of items, comprising "Document Item Lists" ("DI-Lists"), each being part of an electronic document from a computer-retrievable electronic document repository, and
(iii) are selected by a process involving statistical evaluations and processing of factual knowledge and rule-based knowledge, the rule-based knowledge involving one or more rules expressing application-domain specific knowledge;

the operations further comprising:
(1) accessing a knowledge base, the knowledge base storing in permanent and/or non-transitory memory facts and rules, the knowledge base comprising a plurality of application-domain specific facts, and zero or more application-domain independent facts, one or more application-domain specific rules related to the application domain, and zero or more application-domain independent ("general") rules,
(2) inferring new facts from a given set of facts using an inference engine that uses at least one rule from the knowledge base, and
(3) expressing items, relationships among items, and relationships between items and their attributes as facts, where
(i) the facts are represented as logical atoms and/or as relational data tuples that are interpreted by the inference engine as logical atoms, and/or as data structures in a programming language that are interpreted by the inference engine as logical atoms,
(ii) the rules represent logical inference rules having a rule body and a rule head,
(iii) all seed items have a type, known as "Input Item Type", and
(iv) the document repository comprises a search functionality which, for a given set of items searches and retrieves documents containing these items.

The disclosure discusses systems and methods that improve item-set expansion, here also called "list expansion" based on co-occurrences of items in lists, where lists occur in documents of a document store, by combining it with the use of knowledge, some of this knowledge being domain-specific. In some of these methods, knowledge is represented in form of logical facts and rules, and rules are applied to facts in order to generate new facts by a inference engine (often also referred-to as "reasoning engine").

Non-limiting examples of the present disclosure describe systems and methods for expanding an initially given input list of items from an application domain by similar or related items.

In a specific example, a system embodying the present disclosure computes an expanded list of items from the initially given seed list by combining (i) methods for extracting candidate items that co-occur with already established items in selected lists contained in documents retrieved from said document store with (ii) knowledge-based inference tasks involving facts and rules among which at least one domain-specific logical rule related to said application domain. According to the example, a system may comprise a plurality of main software components, including:
(i) A knowledge base (KB) containing domain-specific repositories where domain-specific logical facts and domain-specific logical rules are stored, and general knowledge repositories where general logical facts and general logical rules are stored, and, as part of the KB, a specific rule base containing logical rules for inference tasks at different stages of the list expansion computation process. Where necessary, the KB can be extended by a temporary "local knowledge store" for holding auxiliary and intermediate facts arising during parts of the item set computation. (ii) a tool to access and search the document repository, (iii) a disambiguation component which disambiguate each item in the list of seeds and each item found in documents, (iv) an inference engine consisting of a logic language interpreter usable over facts and rules, stored in the KB (including, where relevant, the local knowledge store).

Knowledge stored in the knowledge base may comprise other types of knowledge that is useful to the list expansion computation, such as knowledge of different item senses, and knowledge of different possible user intents.

Domain-specific rule-based inference is useful as it can improve both the precision and the recall of the item set expansion process. This is briefly explained below:

Improvement of the precision. In some examples, high precision is achieved by using domain-specific rules to impose and enforce conditions that new items ought to fulfill either by themselves or in relation to the seed items or other data. Only those candidate new items that fulfill these conditions are accepted as new items output to the user, For example, in an item set expansion process for generating competitor companies to a given set of competing seed companies, a rule may require that each newly generated candidate competitor C (obtained via list co-occurrence of C with seed companies or already known competitors) is acceptable only if for each seed company S, C has at least one associated Standard Industry Code (SIC-code) that is compatible with at least one SIC-code associated with S. In other examples, domain-specific rules may help classify lists or disambiguate user intent.

Improvement of the recall, for example, in the following two ways: (i) Domain-specific inference can generate suitable expansion items also from existing knowledge, based on other criteria than co-occurrence. Moreover, these new items can then give rise to further appropriate items via co-occurrence in lists in documents. (ii) With item set expansion, an improved precision often automatically implies an improved recall. In fact, just as with Web search, users will be interested in a limited number of results, for example at most max only (e.g. max=30), and the computation stops after this number has been reached. In many examples, computed items receive an score of how well the match certain criteria, and those items with the highest score are listed first in the output. If item set expansion method is imprecise, then, many 'wrong' items may be listed among the first 30 results, and more appropriate items may thus not even appear among the first 30.

Section "Example" presents a comprehensive example explaining in detail, why purely statistical or probabilistic methods may fail, and how this can be redressed by using domain-dependent knowledge in addition.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings, which are incorporated in and constitute a part of this specification, illustrate exemplary designs and examples of the invention and, together with the description, explain the invention. The drawings are briefly described as follows: The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 2 is a diagram of a domain-specific knowledge repository used in a system according to an example of the instant disclosure.

FIG. 3a and FIG. 3b illustrate examples of various DI lists used for extracting candidate items in a system according to an example of the instant disclosure.

DETAILED DESCRIPTION

Figure 1:
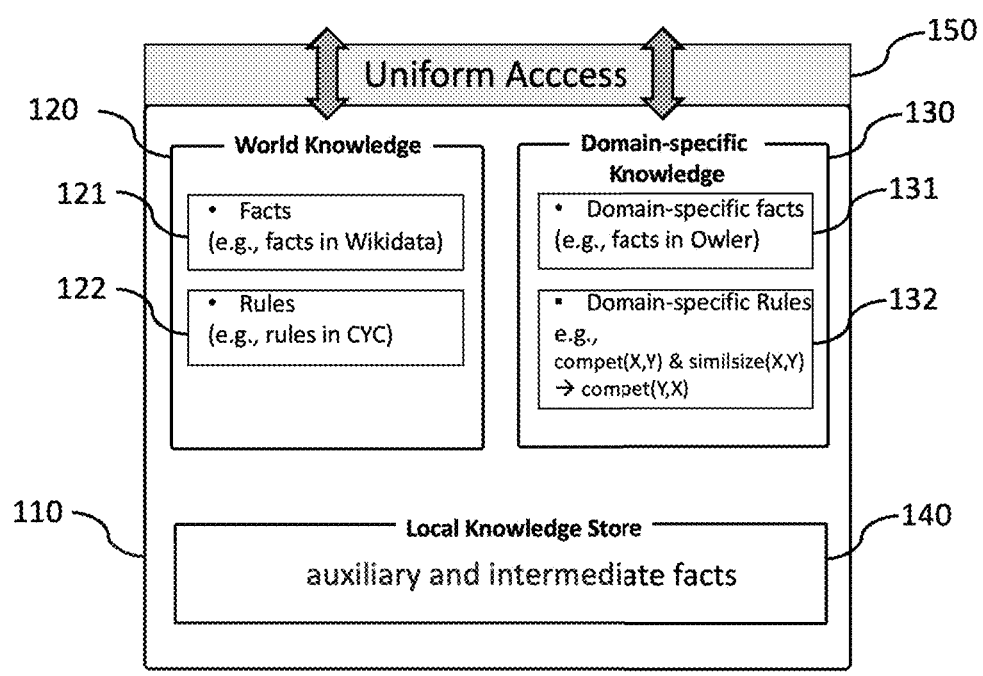
FIG. 1 is a diagram of a knowledge base used in a system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting .forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise.

It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Ranges are used herein shorthand so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively, Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising" "having", "containing" and "consisting of" may be replaced with one another throughout the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Typically" or "optionally" means that the subsequently described event or circumstance may or may not occur, and that the description includes instances where said event or circumstance occurs and instances where it does not.

Wherever the phrase "for example," "such as," "including," and the like are used herein, the phrase "and without limitation" is understood to follow unless explicitly stated otherwise.

Generally, embodiments of the present disclosure are directed towards thermally conductive materials, including, as non-limiting examples, Types of Items In various embodiments of the present disclosure, possible types of said items comprise; (a) a single word, (b) a combination of words, (c) an item identifier (item ID), i.e., an identifier that unequivocally identifies an entity in a database or in a knowledge base (d) a logogram, for example a Chinese or Japanese character, (e) a combination of logograms, (f) a Web link (URL), (g) a hypertext link of another type, (h) a picture provided directly, for example, a picture in GIF or JPEG or any other format, (i) a picture provided via a link, (j) an item descriptor, such as the title of an academic paper or the title of a patent, that describes and identifies an entity within a database or knowledge base.

Logical Representation of Items

In many examples, such as in the simple embodiment described herein, user-provided items are just words or word combinations that represent something. For example, a user may provide a list such as "Apple, Sony, Bose" of companies in form of company names. In other embodiments where each item is associated with an item ID or an item descriptor, users may be allowed or even required to specify items by their IDs or descriptors.

In this disclosure, the word "item" is primarily used as a denotational object as described in the above section of "Types of Items". Such items are often intended to denote a conceptual entity, or equivalently, a "conceptual item", with various properties. For example the item "Sony" is usually intended to refer to the company Sony, which, in a particular embodiment may be associated with attributes such as a company ID, say C10597, according to some company register, its name "Sony", the standard industry codes (SIC-codes) of the Sony company, which are 3651 (for "Household audio and video equipment") and 5064 ("Electrical appliances. television and radio"), and the company's headquarters location (Tokyo). Note: This is just a small illustrative example, in real-life embodiments, many more attributes would be associated and stored with an item, for example also full names of companies, and various business data.

Conceptual items can be stored, for example, as part of a relational database. For example, companies with the above attributes can be stored in a database consisting of two relations: a relation Company with schema (ID, NAME, HQLOCATION) <C10597, SONY, Tokyo>, and <C10597, 5064> of the CS relation. The database could then also contain other relations, such as a competitor relation Competitor, containing a tuple <CID1, CID2> for each pair of company identifiers whose associated companies are known to be competitors, and hence, in this example, a competitor relationship of items can be expressed as a binary relation. Similarly, also relationships among attribute values or other objects can be expressed in form of relations. For example, an embodiment may contain a relation Compat of which a tuple <SIC1, SIC2> indicates that the SIC-codes SIC1 and SIC2 are compatible.

The disclosure discusses a knowledge base and an inference engine, a scheme for logically representing items and other relevant entities, and relationships among such entities is needed so to include relevant entities into the knowledge base and make them accessible to the inference engine. Items are considered here as one type of entities. However it is important to also consider other relevant types of entities (e.g. SIC-codes, even if unrelated to a concrete item, numerical values, and so on). There are two main types of such schemes to be used in different embodiments: implicit schemes and explicit schemes.

Implicit schemes consider a database such as the one of the above example to be directly part of the knowledge base (KB) and directly accessible and modifiable by the inference engine. This is, for example, the case with Datalog systems, many Answer-Set Programming (ASP) systems such as, for example, DLV that can directly access and modify relational databases, and the knowledge graph management system Vadalog. In such systems, each database tuple $<a_1, \ldots, a_n>$ of some relation R is (or can be) implicitly and directly interpreted as logical fact $R(a_1, \ldots, a_n)$ and these systems can directly access and modify the database.

Where no implicit or otherwise automated scheme for interpreting and treating database tuples as logical facts is given, an explicit scheme must be used. In many embodiments where the items with their properties, as well as the other relevant entities, are stored in a relational database, the scheme would just translate the database tuples into logical facts and store these tuples in fact-base which is part of the knowledge base and is input to the inference engine. Thus each database tuple $<a_1, \ldots, a_n>$ of some relation R would be explicitly translated to a logical fact $R(a_1, \ldots, a_n)$. Note that by these scheme, items-IDs and their related attribute values are treated as logical constants, and relationships between such objects are represented via facts corresponding to appropriate logical predicates. A conceptual item is then constituted by all those facts in which its item ID, but no other item ID occurs.

Note that by such a translation, the attribute names are lost. In case these attribute names are relevant to the item expansion computation, for instance in more sophisticated environments discussed in the section of "additional data", these can be translated into metadata facts. For example, the translation of the above example-relation Company with schema (ID, NAME, HQLOCATION), in addition to generating facts of the form Company(u, v, w) as illustrated above, the following three tuples could be generated in order to keep knowledge about the attribute names:
AttrName(Company, 1, ID),
AttrName(Company, 2, NAME), AttrName(Company, 3, HQLOCATION),
which, in an obvious way, associates to the predicate Company the names of its three attributes. Note that predicate names are used as data constants here, which is a second-order construction that is unproblematic as long as these predicate name constants are explicitly handled by programmers or knowledge engineers who write the rules of the KB.

If none or only some of the facts to be included in the KB are readily available in a database or similar data collection, then all other facts ought to be directly asserted into the KB.

Even if attribute names are not present, one can speak about "the attributes of an item". These could be formalized as triples (predicate, argument-position, attribute-type) for all relevant predicate that constitute an item. For example, in the above "Companies" example the conceptual items are companies, and the companies are described by the of the form Company(u, v, w) and CS(x, y), the attributes are (Company,1,key), (Company,2,sv) (Company,3,sv), (CS,1,sv), (CS,2,mv), where "key" designates a key attribute, "sv" a single-valued attribute, and "mv" a multi-valued attribute such as a set of SIC-codes.

For each embodiment that uses item attributes, when one speaks about "the attributes" of an item, one means the relevant attributes of the conceptual item. Moreover, it shall be clear what these attributes are, either implicitly because certain attributes are used and others not, or explicitly, because attributes are explicitly stored as "meta-information" facts such as, for example, Attribute(Company, 1, key), and so on.

The content of the present section is mostly of explanatory nature and seeks to clarify how, in various embodiments, a scheme for logically representing items and other entities and relationships among entities can be adopted, and to elucidate the meaning of "the attributes of an item". This is by no way limiting. In other embodiments, there may be different schemes, for example based on different data or knowledge sources (e.g. graph databases, comma-separated values files, and so on) and appropriate translation schemes and/or other appropriate ways of logically representing items and other entities, and their relationships.

Document Repository

The term "document repository" may be interpreted to its broadest extent throughout the descriptions herein. In various embodiments, it may consist of one system or a combination or an integration of systems from a group of systems comprising: (a) the World Wide Web, (b) an intranet or a federation of intranets, (c) a document management system, (d) an electronically searchable document or library catalog with links to online documents or to electronically stored documents, (e) a full-text database, (f) a database that stores text fields and that can retrieve texts via a suitable query language, (g) a searchable content management system, (h) a social network, where user posts are regarded as documents, (i) an image repository retrievable by an image search facility retrieving images from documents, and (j) a log management system of Web search queries.

Knowledge Base

As shown in FIG. 1, a "knowledge base" (KB) 110 is understood as an organized collection of knowledge in form of facts and rules about real-world entities and relationships. Here it is assumed that knowledge bases are available in electronic form, for example as databases or as data files containing logical atoms and/or rules in some logical language, or as a searchable archive of Web data. A "world knowledge base" 120 is a KB that contains encyclopedic knowledge about people, historical facts, objects, relationships, and so on, of general interest across all sectors. Examples of publicly available world KBs are Wikidata (https://www.wikidata.org /wiki/Wikidata:Main_Page) and Yago (https://yago-knowledge.org/), and the online encyclopedia Wikipedia itself. These world KBs contain factual knowledge 121 comprising also ontological knowledge expressed as facts. A world knowledge base which, in addition to facts contains also a very large number of rules 122 is CYC (see https://en.wikipedia.org/wiki/Cyc).

A domain-specific KB is one containing domain-specific knowledge relevant to a certain application area, such as companies, businesses competitor finding, products, health, finance, religion, animals, plants, and so on. There are domain-specific KBs at various levels of generality. An example of a domain-specific fact base 131 is a national company register with company names, company IDs and a list of standardized industry classification codes (SIC-codes) for each company. This KB contains domain-specific facts only. Other KBs may contain domain-specific rules 132. For example, $$\text{compet}(X,Y) \& \text{similsize}(X,Y) \rightarrow \text{compet}(Y,X)$$

is a domain-specific logical rule formulated in the Datalog language, which (if the "compet" and "similsize" predicates are appropriately defined) state that if X is a competitor of Y and Y is of similar size as X, then Y is also a competitor of X. A further domain specific KB may integrate the above two KBs intoto a more comprehensive domain-specific KB containing both facts and rules.

Systems embodying the present disclosure contain a knowledge base storing logical facts and logical rules, which include one or more domain-specific facts and/or rules related to a particular application domain. Logical facts stored in the knowledge base may be incomplete and noisy. Unlike some existing work which assumes the existence of a complete and accurate knowledge base, the system discussed herein does not necessarily require a complete and precise set of logical facts.

Logical facts and rules stored in the knowledge base are expressed in a formalism from a group comprising: (a) a classical logic programming language such as Prolog, (b) answer set programming such as DLV, Clasp, SModels, (c) a logical database query language such as Prolog or Datalog or variants, (d) a logical knowledge graph query language based on tuple-generating dependencies such as Vadalog, (e) a database query language such as SOL or Cypher, or fuzzy Datalog where queries are regarded as rules, (f) any of the above formalisms syntactically and semantically extended by one or more inference features in a group comprising fuzzy inference, probabilistic inference, many-valued inference, higher-order inference, inference with incomplete information, uncertain inference, disjunctive inference, temporal inference, inference with built-in generalized quantifiers, (g) one or a combination of the above formalisms further extended by arithmetical and/or statistical aggregate functions, (h) one or a combination of the above formalisms further extended by interfaces to external software resources, such as API or other interfaces to DBMS, data warehouses, CRM, machine learning software, trained neural networks, classifiers, optimization packages, integer and linear programming software, NLP packages, standardized user interface and graphics packages for user interactions (e.g., for users to give examples or to give feedback), where such interfaces can be addressed and used via special predicates, and where said inference engine is able to infer new facts from a set of facts and rules expressed in said formalism. Examples of formulating logical facts and rules are given in the section of "A Simple Embodiment".

A knowledge base in a system and implemented for a particular application domain contains: (a) one or more domain-specific knowledge repositories storing all available relevant domain-specific logical facts and domain-specific logical rules, and (h) zero or more general knowledge repositories storing general logical facts and general logical rules of broad interest across all sectors, and (c) a local knowledge store holding knowledge arising during the execution of said list expansion computation.

A restricted version of this disclosure (Claim 2 and depending claims) requires in addition that at least one domain-specific rule be contained in the knowledge base and be used in the inference process.

Domain-Specific Knowledge Repositories

As shown in FIG. 2, domain-specific logical facts 220 stored in the domain-specific knowledge repositories comprise one or more of the following types of facts about entities in the domain:
(a) Attributes 221 of entities in the domain, containing primary attributes and application-related attributes that are beneficial to a particular application. For example, for an application of company competition discovery in the domain of business competitor finding, the domain-specific knowledge repositories contain logical facts of which argument positions correspond to basic attributes of companies such as NAME, LOCATION, WEBSITE, and so on, which, for large companies, would also appear in Wikipedia or Wikidata, as well as to more domain-specific attributes of companies such as COMPANY ID, SIC-CODE, PRODUCT, KEYWORD and others. Such attributes of entities can also be the ranks of entities in ranked lists, e.g., university rankings, opera rankings, restaurant rankings, sports teams rankings, etc. These rankings provide domain-specific knowledge that can be helpful in identifying similarities between entities. A ranking can be given in a database or on a file that is part of the KB or can be accessed via a bespoke application programming interface (API) or an interactive wrapper or other type of data interface from a website such as, for example, the Times Higher Education World University Rankings (https://www.timeshighereducation.com/world-university-rankings/). In this sense, even domain-specific websites can be integrated into the domain-specific KB and thus be part of this KB.
(b) Relations 222 in the domain containing: (i) relations among entities in the domain. For example, in the domain of companies, such relations comprise various relations among different enterprises, such as competition relations, collaboration relations, shareholding relations and so on; (Note that a ranking, i.e., a ranked list can, in its totality, be considered a relation, more specifically, a partial or total order of the set of underlying items or entities (e.g. universities); (ii) relations among domain attributes values, such as a functional dependency relation between PHONE and LOCATION; (iii) relations among the values of the same attribute, such as a compatibility relation of two SIC—codes 5599 (Automotive Dealers, Not Elsewhere Classified) and 5521 (Motor Vehicle Dealers (Used Only)), a hierarchical relation between a restaurant's two RESTAURANT_TYPE values: "Asian" and "Chinese"; and other types of relations.

As an example, the domain-specific logical rules 230 stored in the domain-specific knowledge repositories comprise the following types of rules:
(a) rules 231 associated with the core step of the list expansion computation, i.e., deciding whether an item should be appended to the list expansion result. In some examples, one or more of such rules constitute domain-specific knowledge, and, in many embodiments, such domain-specific rules will operate on domain-specific facts, and thus contain predicate symbols being also those of domain-specific logical facts.
(b) rules 232 associated with the other intermediate steps of the list expansion computation, such as logical rules used in the process of item disambiguation process.

Preparation of the Knowledge Base

Knowledge repositories in the knowledge base of a system are generated by selecting knowledge from existing knowledge repositories, and optionally by one or more of the following methods: (i) manually generating domain knowledge (ii) automatically extracting domain-specific logical facts from external data resources using similar techniques automatically learning new knowledge from knowledge in existing knowledge repositories by adopting similar methods. For example, the logical facts about compatibility relations of SIC-codes can be learned from pairs of company competitors in an existing knowledge base.

At least one of said domain-specific knowledge repositories is selected from a group comprising: (a) an enterprise knowledge graph such as, for example, Amazon KG, Google KG, Meltwater KG, (b) a sector-specific knowledge graph such as, for example, Crunchbase, Owler, eGeoNames, FactForge), (c) a domain-specific dictionary (e.g., FOLDOC), of which each dictionary entry consists of the surface names of the entity, including a canonical name and a list of synonyms; and the entity type, (d) a domain-specific database, such as a relational database (or some other database) that stores company information for each company and relationships between different companies, (e) an enterprise database, such as a database used by a retailer company to manage their internal collection of customer and market data, (f) an enterprise data warehouse, (g) an enterprise CRM system, (e.g., Salesforce, FreshSales), (h) a domain ontology (e.g. GoodRelations, snowmed, Amazon ontology), (i) a domain-specific social network (e.g., LinkedIn or social extra-nets such as customer community networks), where with said social networks, user profiles and links are regarded as knowledge.

In various examples, general knowledge repositories in the knowledge base of a system are selected from a group comprising: an online dictionary such as Wordnet, or BabelNet, a general knowledge graph, such as DBpedia, WebIsADatabase, a world ontology, such as WikiData, YAGO, Wikipedia, an AI knowledge base such as CYC. Such knowledge sources, in some embodiments may be directly integrated (possibly via APIs) into the KB, and in some other embodiments may be translated into an specific logical formalism.

Moreover, the knowledge base may contain one or more general interactive knowledge repositories that are based on language models and that can be interactively interrogated through a chat bot or an API. An example is ChatGPT by OpenAI. An item set expansion system could automatically interact with such a system in order to complement its knowledge about items and their relationships. For example, if the system has not enough knowledge about the products of a company "ACME", it could ask the question "List all products of ACME". The ISE system could also directly ask for items similar to those in a seed list, for example for a list A, B, C of competing companies, the ISE system could ask ChatGPT or a similar system: "Which companies are competitors to A, B, and C", or "on which products do D and E compete". While the answers might not be very accurate and reliable, they could provide useful information after being further analyzed and filtered by the ISE system. Such interactive language-model based knowledge repositories usually compute their answers based on knowledge about the probability distribution over sequences of words or phrases. The knowledge incorporated in such systems is thus predominantly of statistical nature.

In some examples, a system's knowledge base contains a local knowledge store 140 holding knowledge arising during the execution of list expansion computation. Such new knowledge may comprise one or more of following types: (a) newly discovered knowledge that complements knowledge repositories in the existing knowledge base, such as a new logical fact that does not exist in the knowledge base. For example, a company phone number missing from the knowledge base, or a newly detected compatibility relation between two SIC-codes. (b) temporary knowledge that is only useful to some particular stage of a list expansion computation process. Such knowledge may include intermediate computation results, and it temporarily resides in the local knowledge store. All temporary knowledge that has not been integrated into the KB is eliminated immediately after its life cycle. Examples of temporary knowledge produced during a list expansion computation are given in Step-4 of the section of "A Simple Embodiment". In some embodiments, newly discovered knowledge saved in the local knowledge store is integrated with the domain-specific or the general knowledge repositories after a list expansion computation completes or at some other proper stage. During the integration process, such new knowledge may sometimes conflict with existing knowledge in the knowledge base. For example, some company's email address stored in the knowledge base is outdated and is different from what is newly extracted from a Web page. In some embodiments, a human may be asked to resolve such conflicts. In some other embodiments, some automatic data quality validation programs may be triggered to decide which data is the correct one, using some conflict resolution methods.

In some examples, two or more knowledge repositories described above are integrated by interfaces for querying and/or updating said knowledge repositories uniformly 150, and for exchanging knowledge in a uniform manner between said knowledge repositories and said local knowledge store. Many existing methods of knowledge integration can be used, such as designing a general knowledge representation model to uniformly represent information acquired from different knowledge repositories and using logical rules to construct an integrated knowledge base.

Lists in Documents (Di-Lists)

Figure 3A:
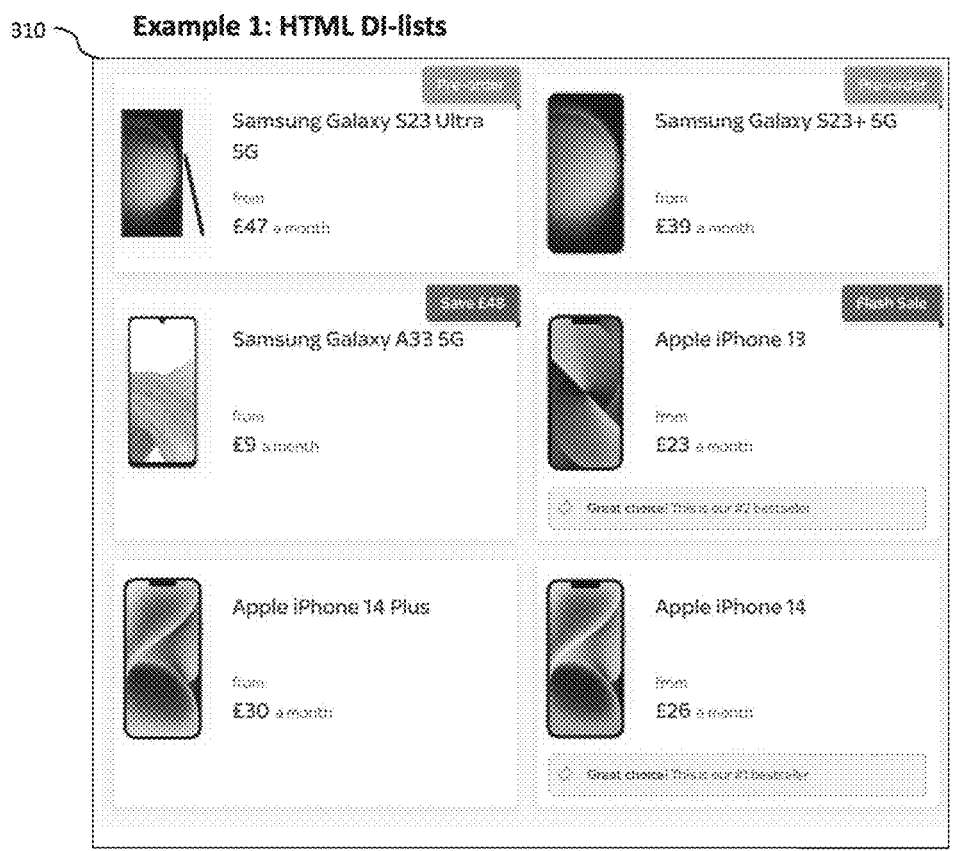
Figure 3C:
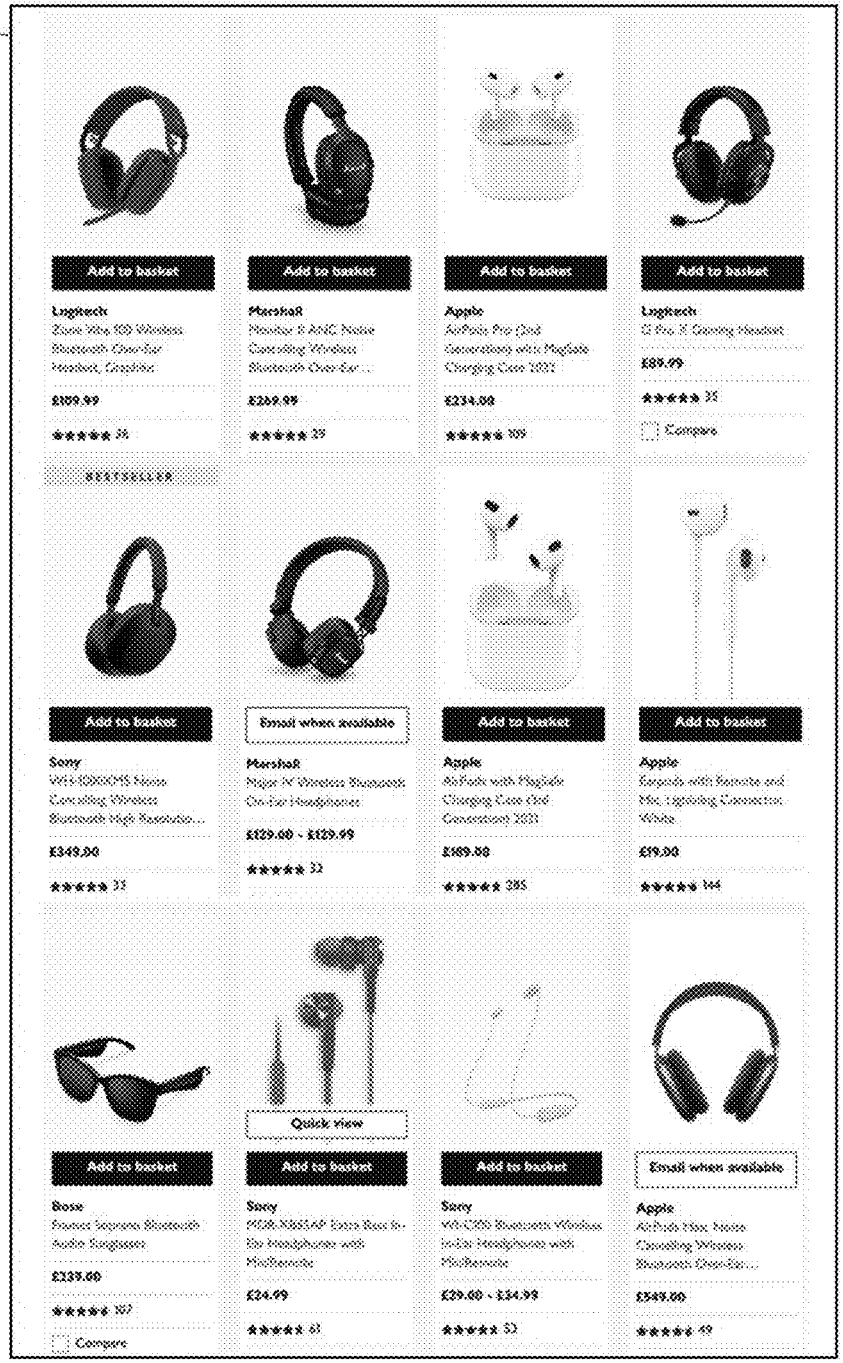
FIG. 3c illustrates examples of candidate items extracted from a DI list by a system according to an example of the instant disclosure.
Figure 3D:
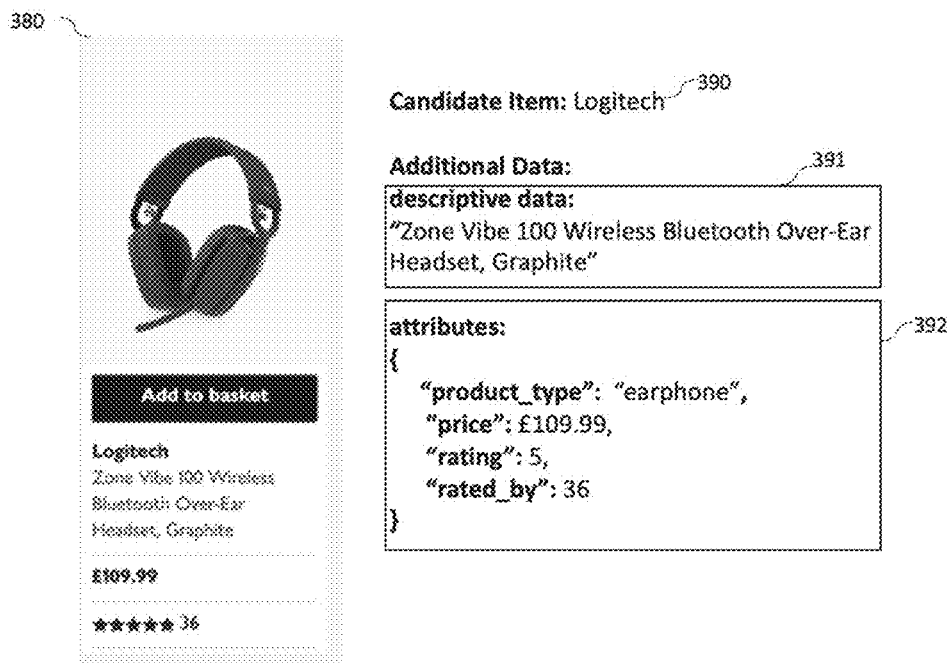
FIG. 3d illustrates examples of additional data of candidate items extracted by a system according to an example of the instant disclosure.
Figure 4:
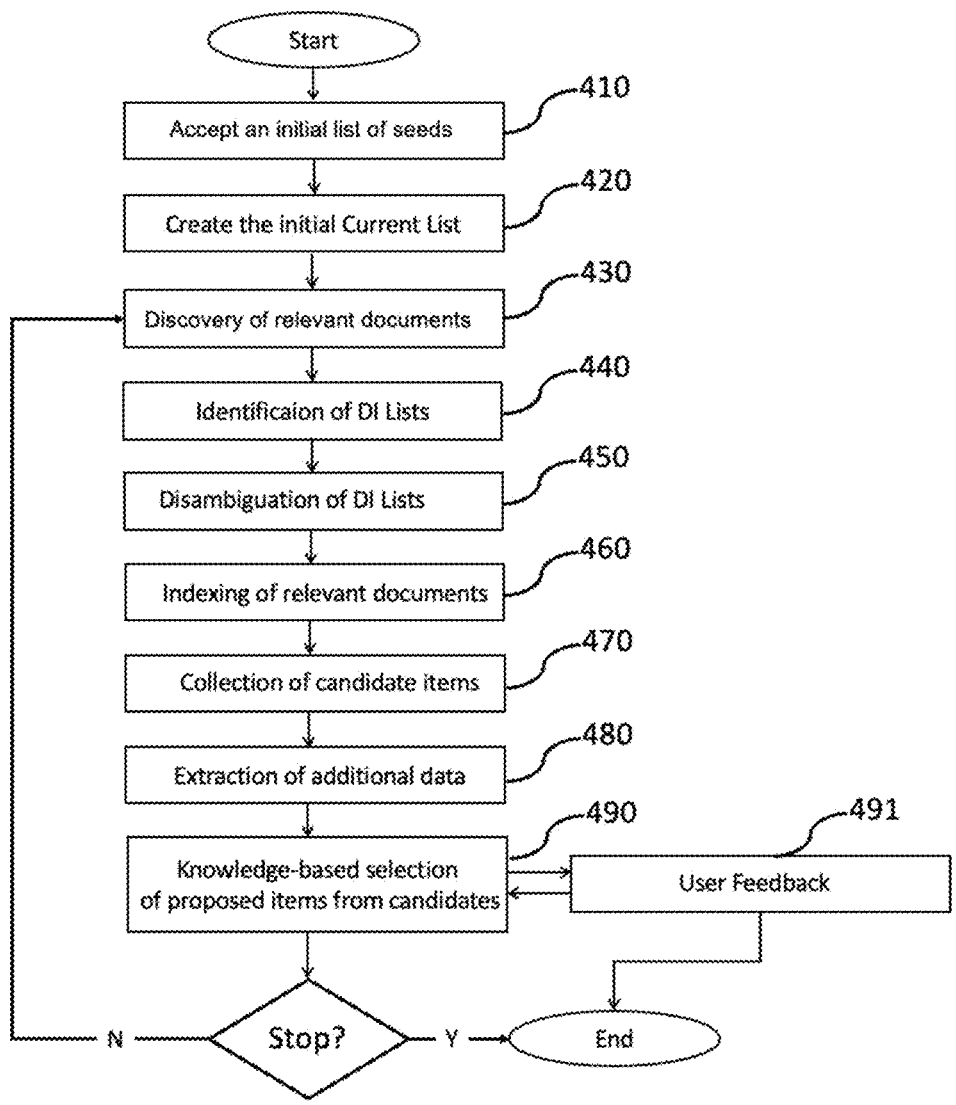
FIG. 4 is a flowchart of processing for expanding a list of seed items according to an example of the instant disclosure.

Systems and methods exploit lists in documents of the document repository, so called so-called "DI lists", as resources for discovering items matching the user's intention. A DI-list or shortly "list", if the document context is understood, may indicate a number of explicitly or implicitly related items occurring in the same document. As shown in FIG. 3, a DI-list may be an explicit list, such as an HTML list 310 commencing with a tag of <DL>, <UL> or <DL> or presented in other ways; a textual list 320 where items are separated by delimiters (e.g., comma), including an optional conjunction word (e.g., and, or) before the last item; a list of bullets 330; a row or a column of fields in a table 340; a reference list 350; and so on. For some embodiments, a DI-list (or simply "list", when the document context is understood) may also mean an implicit list, such as those items that are not structured as a list but have similar roles in their context (e.g., restaurants mentioned in a restaurant-review article.) Two or more items are said to co-occur in a list, if the items occur in the same list. As shown in FIG. 3c, candidate items 372 that co-occur with seed items 371 are extracted from a DI list 370 that contains the occurrences of seed items 371. As shown in FIG. 3d, additional data of each item 390, including descriptive data 391 and attributes 392 of the item, may also be extracted from the corresponding part 380 in the DI list that contains the item.

Rule-Based Inference

A system embodying the present disclosure performs logical-rule-based inference tasks at different stages of its list expansion computation process. A logical rule used by the system, either general or domain-specific, may be expressed in various formalisms in different embodiments. For example, a logical rule may be expressed by a classical logic programming language such as Prolog. It may also be expressed in an extended formalism that supports one or more advanced inference features such as fuzzy inference, probabilistic inference, and so on. In some embodiments (as also explained below), logical rules could also be queries formulated in SQL or another appropriate query language.

Logical rules are helpful to different decision processes of a list expansion computation process. For example, the process of deciding which candidate items should be taken to expand a list (e.g., Step-4 in the section of "A Simple Embodiment") heavily uses logical rules to perform inference upon items' various logical facts. Also, logical rules may be used in the item sense disambiguation process (as described in the section of "Item sense disambiguation"); and in the knowledge integration process (as described in the section of "Knowledge Base").

In some embodiments, domain experts generate logical rules according to the specific application requirements. While in some other more complicated embodiments, all or some rules may be automatically learned from existing knowledge bases or from the computation results of different stages of the whole list expansion computation.

Figure 5:
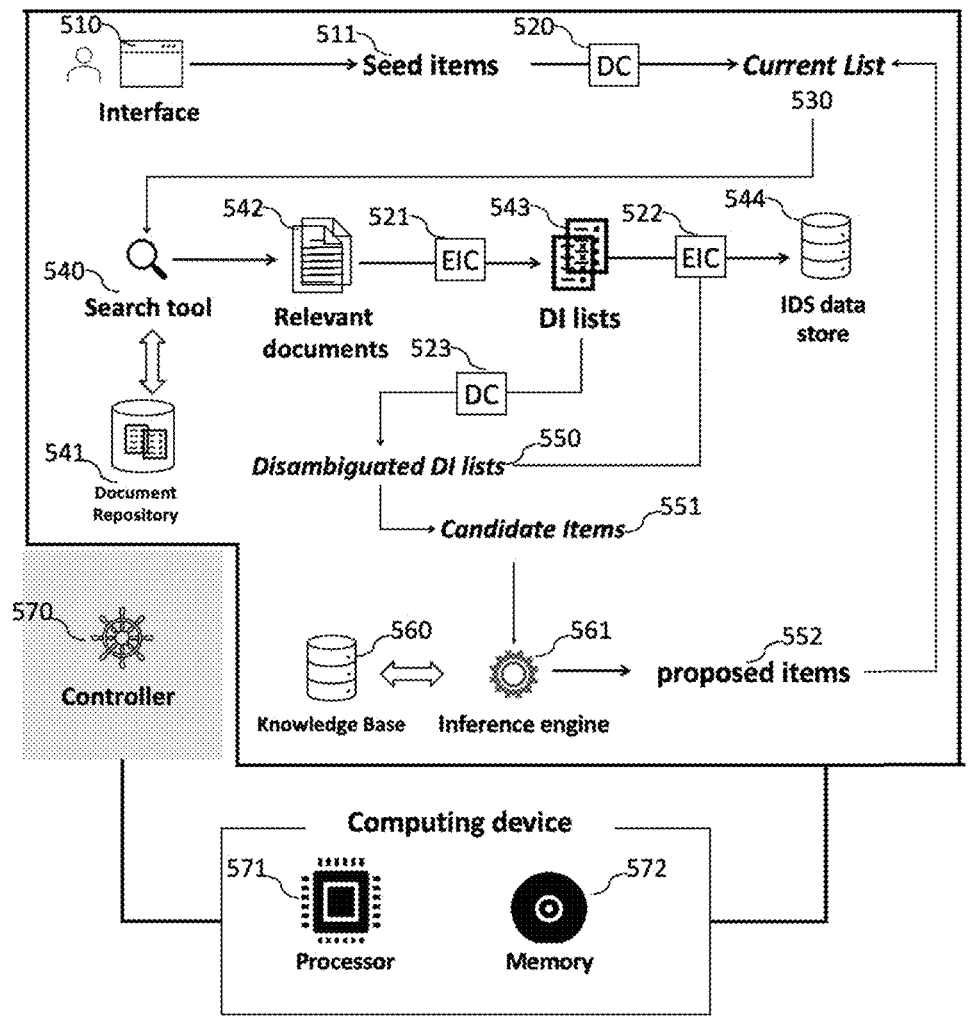
FIG. 5 shows outline illustrations of a system according to an example of the instant disclosure.
Figure 6:
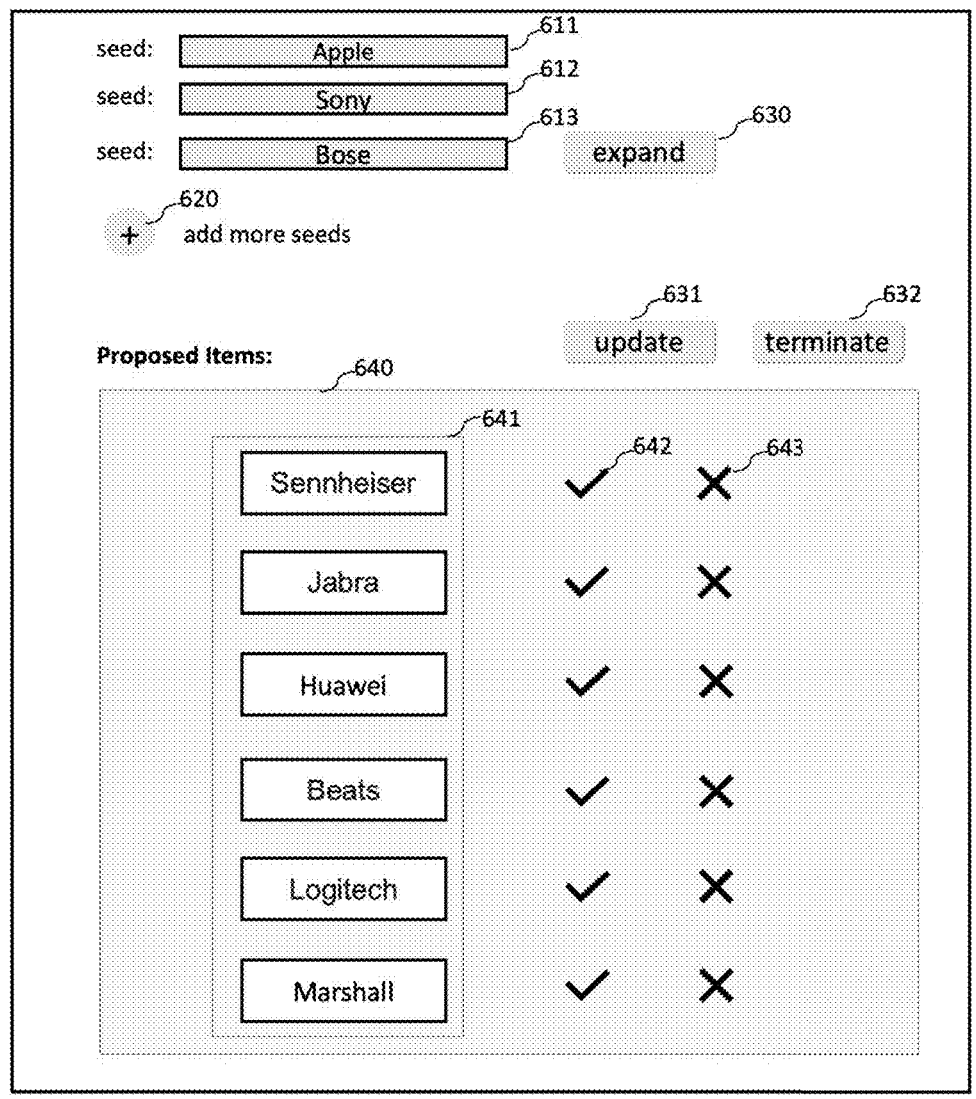
FIG. 6 shows a user interface in a system according to an example of the instant disclosure.

As shown in FIG. 5, systems embodying the present disclosure contain an inference engine 561 for applying logical rules to the knowledge base to deduce new knowledge. Inference engines in different embodiments are capable of executing different types of logical programs. For example, in some embodiment, an inference engine may be (or contain) an interpreter of some classical logic programming languages (e.g., Prolog or Datalog), in other embodiments VADALOG or Problog may be used, and some further embodiments may use solvers of Answer Set Programming (e.g., DLV, Clasp, SModels) or other engines. In yet other embodiments, where logic rules are expressed as SQL queries or queries in another query language, the inference engine can be a SQL query processor (which is usually a part of a database system), or a query processor for a different query language, respectively. In some other embodiment, logic rules are expressed as functions or conditional statements in a general-purpose programming language (such as Python, Java, etc.), and the inference engine can be a runtime system or a runtime environment of the used programming language. This merely exemplifies, but does not limit in any way, the kind of inference engines which can be used in embodiments of this disclosure.

An Example

Given that the disclosed system operates with knowledge including domain-specific rules in particular application domains, and to explain how such rules may be used, and how they interact with other features of the item expansion method, it is convenient to fix an application domain. Of course, fixing an application domain, and exhibiting a particular type of interaction should in no way limit the system, whose scope is much broader and is described by the claims and possibly by other parts of this description extending one or more of the claims.

The workflow of the system described in the current example consists of the following steps. At Step-1, the system accepts an initial list of seeds 410 and creates the initial Current List 420. At Step-2, the system discovers relevant documents 430, identifies 440 and disambiguates 450 DI Lists from these relevant documents. Each relevant document is indexed for use in future tasks 460. At Step-3, the system collects candidate items from DI Lists 470. In some other examples, the system also extracts and utilizes additional data of items 480, as will be described in the section of "Additional data". At Step-4, the system selects proposed competitors from candidates 490. In some other examples, user feedback 491 is properly utilized at Step-4, as will be discussed at the end of the description of Step-4 farther below. At Step-5, the system repeats Step-2, Step-3, and Step-4 until a termination criterion is satisfied or the user stops the program.

In the current example, a system will be described with reference to set expansion from DI-lists 543 contained in Web documents 542 in the particular domain of company competition discovery. However, the disclosure is applicable to set expansion from other document repositories relating to any other domains.

The described embodiment presents a solution to the Item Set Expansion problem of finding company competitors. In particular, given a list of company names 511, supposed to be competitors, the system expands the list by adding further competitors.

In the simple embodiment described here, the system uses the Web as the document repository 541, and HTML Web pages as documents. This, again, is not a limitation: An extended embodiment would also consider other types of Web documents such as, for example, Web-retrievable PDF files and similar resources and DI-lists therein. In particular, as described below, this simple embodiment will deal with DI-lists 543 on Web pages containing a plurality of company names only. Such DI-lists will be referred to as "company lists" hereafter. In some more sophisticated embodiments, more complex DI-lists are considered, such as lists of records containing company names together with other company attributes.

Throughout this description, a company's ID (CID) is frequently referred to. CID uniquely identifies a company in a given Knowledge Base, and can be used as a key through which attributes and other connected data describing (or closely related to) a specific company can be accessed. For a company C, its CID and the relevant data connected to C are jointly referred to as "the relevant data structure" associated with C.

In the simple embodiment here described, the relevant data structure associated with each company comprises; the company's CID and two attributes: the company's name (NAME) and its SIC codes (SIC). In other embodiments, other attributes may be used.

The system, which runs on a Web-accessible server (except for an external search engine such as Bing Web Search, which is called by its API), consists of the main software components listed below. All the main software components of the system are orchestrated by an implemented control mechanism, referred to as "controller" 570 in the description below. The controller determines the order of the task execution of various main software components. Each of these main software components can be invoked by, and exchange data with the controller and other components via APIs. In various embodiments, the controller can be written in a classical programming language that is compiled or interpreted. A controller can do some tasks by itself, such as main i/o, maintenance of item lists, and so on. A controller could also be implemented in a logic programming language (for example, Ciao Prolog or ProbLog) that may be the same language in which the facts and rules of the KB are expressed.

$C_1$ A Knowledge Base 560 which contains company related data for a large number of companies. This data consists of at least the following facts of or about companies:

(a) a set of logical facts (i.e., logical atoms) of the form CN(c, n) where c is a CID and n is the corresponding company name. As usual, such a set of facts with the same predicate name CN is identified with, and implemented as, a data relation CN of a relational database, whose first attribute is a CID and whose second attribute is a company name. (For the correspondence between data relations and sets of logical fact. Note that by CN, a same CID c may be associated with multiple company names $n_1, \ldots, n_k$, giving rise to facts CN(c, $n_1$), ..., CN(c, $n_k$). For example, assume that Facebook's CID is 123, then there could be facts CN(123, 'Facebook'), CN(123, 'Meta'). and CN(123, 'FB'), where the last is also the stock symbol of Facebook.

(b) A set of logical facts of the form CS(c, s) each such fact specifying that a company with CD c has SIC (https://en.wikipedia.org/wiki/ Standard_Industrial_Classification) code s. Again, this can be represented and implemented in form of a relation CS in analogy to the above. A company (CID) can have multiple SIC-codes, and the same SIG-code can be associated to multiple companies (CIDs).

In another embodiment, the Knowledge Base may contain more company attributes than just described, such as PHONE, EMAIL, ADDRESS, etc.

(c) Compatibility facts of the form Compat (s, s') expressing that two SIC-codes s and s' are compatible. Compatibility here means that the two SIC-codes cover overlapping products or services. In particular, each SIC-code is compatible with itself, and thus for each SIC-code s, the KB contains a fact Compat(s, s'). In this simple embodiment it is assumed that the set (or relation) of facts are known upfront and are never changed during the item expansion computation. In another embodiment, these compatibility facts may be learned from an existing verified competitor database.

(d) A domain-specific rule base that consists of rules formulated in Prolog for selecting company competitors, given in Step-5 farther below; (In other embodiments, rules formulated in other logic programming languages, and/or may serve other purposes).

$C_2$ A search engine API 540 (such as Bing Web Search API (https://www. microsoft.com/en-us/bing/apis/bing-web-search-api)) through which URLs of relevant Web pages can be obtained via search engine queries.

$C_3$ A Web page parser that retrieves the content of Web pages as well as the HTML source code, optionally with the help of an embedded browser, and parse the retrieved results into a Document Object Model (DOM).

$C_4$ A disambiguation component (DC) 520 523, which disambiguates each company name in a given list $\mathcal{L}$ by mapping each company name n in $\mathcal{L}$ to a unique CID c(n)

or to a null value null if no matching CID can be found, and converts $\mathcal{L}$ to a new list $\mathcal{L}$ of pairs <c(n), n>. A list D($\mathcal{L}$) is called a disambiguated list hereafter. It is assumed here that some well-known existing disambiguation or entity resolution method is used for mapping each company name to a unique CD. Many such disambiguation or entity resolution methods have been studied and are used in practice. Some of them take keywords, further attributes, and metadata available on the Web page containing the DI-list into account. Here it is not further described any particular disambiguation or entity resolution method, as such methods are well-known and do not constitute an innovative aspect of this simple embodiment. It is just assumed that one of the known disambiguation methods is used. (In more refined embodiments, novel methods may be used for disambiguation, that take application-domain knowledge such as SIC-codes and/or application dependent rule knowledge into account.)

$C_5$ An extraction and indexing component (EIC) 521 522, which performs the following operations on each retrieved Web page p:
(i) it extracts, where possible, company lists from p;
(ii) for each extracted company list $\mathcal{L}$, it calls DC to disambiguate company names in $\mathcal{L}$ and convert $\mathcal{L}$ to a disambiguated list D($\mathcal{L}$).
(iii) for each Web page p, EIC indexes p by generating an index data structure (IDS) which comprises in form of suitable data structures: (a) metadata including the Web page's URL, the timestamp of when the Web page was last indexed; and (b) a list DL of the computed disambiguated company lists. An IDS expires after a fixed time period has elapsed since the time of when it is generated. The constant MaxTime express this period.

$C_6$ An IDS data store 544 which contains an index table of (i) a binary relation IDSRel comprising data tuples, of which the first element is the URL of some Weg page already indexed by EIC and the second element is a pointer to the corresponding IDS, and (ii) all the IDSs that were generated by EIC so far (in the course of previous item expansion computations, or in previous steps of a current computation) and have not expired. In this embodiment, this data store is implemented as a relational database. In other embodiments, it can be implemented via different types of databases via different data structures, and/or be part of the Knowledge Base.

$C_7$ An inference engine 561 consisting of a Prolog interpreter usable over facts and rules stored in the knowledge base and/or other given facts (arising during the computation).

In other embodiments, the inference engine may support the rule execution of rules formulated in other logic programming languages. In the simple embodiment described here, the inference engine can be any commercial or freely available Prolog interpreter.

$C_8$ A user interface 510 implemented as a Web application, which can be accessed via its URL. It consists of (a) a list of initially 3 input fields 611, 612, 613, to which one more field can be added 620 when all the existing fields are filled, (b) a display and interaction area 640 for presenting information for the user to read and interact with when necessary, as will be described below. In this embodiment, the user interface has the following functions:
allow the user to specify an input list items, called the "seeds", by entering the seeds one by one into the input fields,
display expansion results in form of an expanded list 641 of items at various stages, in the display and interaction area, and allow the user to select 642 or un-select 643 items not matching the user intent. In the display and interaction area, for each company of an expanded list of items, its attributes such as NAME, CID, or the textual description of each SIC category of the company are displayed,
display text message to the user,
allow the user to get an updated set of proposed items 631 or stop 632 the expansion computation (e.g., if enough relevant new items have been found).

In other embodiments, the user interface may allow a richer set of user interactions, and instead of a Web application, the user interface can also be part of a software that may be incorporated into a local client and runs locally.

The five steps of the list expansion computation performed by this embodiment are now described.

Step-1: Accept an Initial List of Seeds and Create the Initial Current List.

The system starts by accepting a list of seed items 511 given by a user. In this embodiment, a seed is simply a company name. A user specifies seeds via the user interface 510 of the system by entering the seeds into the input fields.

The disambiguation component DC 520 converts the list of seeds S into a disambiguated list D(S). (In some other embodiments where users specify companies directly by their CIDs, a disambiguation process is not necessary.) If there is any pair <null, n> in D(S) which indicates that DC failed to find a matching CID for the company name n, then the controller displays a message of "Please replace the company with another one, as we currently don't have adequate facts about it in our knowledge base." in the text message box on the user interface, asking the user to replace n with some other company name. After the user replaces n with a new company name, the controller re-triggers the whole process.

All non-null CIDs of the disambiguated list form the initial Current List 530. The term Current List refers to an instance of the continuously expanded list of companies at a certain moment of the whole process. Since the element of the Current List, i.e., a CID, refers to a real-world company, sometimes the term "the companies in the Current List" is used to refer to the corresponding companies of the CIDs in the Current List for the convenience of description.

The Current List is complemented by sublist called NewItems which contains only those CIDs that were added in the most recent step to the Current List. Consequently, after STEP 1, NewItem, contains all CIDs of the current (and its value is thus identical to the value of the Current List).

Explanatory Note: In the following two steps (Step 2 and Step 3), those candidate items, i.e., companies, that may be competitors of the companies in the Current List, are collected from the document repository, which in this embodiment is the Web. To do so, the system taps into the Web and takes advantage of company lists occurring on Web pages. The rationale here is that companies mentioned in the same company list occurring on a certain Web page usually have a particular relationship to each other, such as companies that sell similar products, companies that provide the same type of service, companies located in the same geographical area, and so on. Therefore, it is likely (but not certain) that companies mentioned in the same company list may be competitors of each other.

Step-2: Discovery of Relevant Documents, Identification of DI Lists, and Indexing of Relevant Web Pages.

First, a Web search for relevant Web pages 542 in the document repository 541 is performed via the search engine API 540. A Web page is relevant if it contains occurrences of company names that also appear in the Current List. To this purpose, different Web queries are used and submitted to the search engine.

The form of the queries is described in the following. For a given fixed parameter k (say, k=3) each set S of k CIDs from the Current List, where S contains at least one CID from NewItems will give rise to a query Q(S). Each query Q(S) is generated by concatenating company names of CIDs in S via an AND operator, forcing the search engine to search for Web pages containing occurrences of all company names constituting the query.

Each relevant Web page is indexed by the Extraction and Indexing Component (EIC) 521 522, with the the following motivations: (a) avoiding, where reasonable, repeated list extraction and disambiguation computations for a same Web page; (b) increasing the reaction speed of the system; (c) saving Web traffic; and (d) minimizing the usages of search engine APIs, and so on. In other embodiments, the indexing process may be done beforehand at a large scale (such as at the full-Web scale). Yet in another even simpler embodiment, there is no indexing process at all, and all Web pages are treated as new ones. Observe that whenever EIC is triggered to execute the indexing of a Web page, it saves the indexed result, i.e., Index Data Structure (IDS) of the Web page in the IDS data store 544. As the system accomplishes more and more Set Expansion tasks, the number of indexed Web pages gradually increases, and there is a growing chance that the stored IDS can be reused for future tasks.

Algorithm 1 INDEXWEBPAGE(u, IDS): index a Web page and save the indexed result in the IDS data store.
Input: u—URL of a Web page.
Input: IDS—IDS data store.
If ∃t∈ IDS.IDSRel, where t.URL=u then
   pointer←getPointer(IDS.IDSRels, u);
   ⟨ meta, DL⟩ ←getIDS(IDS, pointer);
   If TimeNow−meta.ts≤MaxTime then
     return
p←parseURL(u);
L←extractLists(p);
DL←∅;
If L≠∅ then
   foreach $\mathcal{L}$∈ L do
     $\mathcal{D}$ $\mathcal{L}$ ←∅;
     foreach n ∈$\mathcal{L}$ do
       c←disamb(n,$\mathcal{L}$);
       $\mathcal{D}$ $\mathcal{L}$.add(⟨ n,c⟩ );
     DLadd($\mathcal{D}$ $\mathcal{L}$);
else
   DL←null;
meta←⟨ u,TimeNow⟩ ;
pointer←store (⟨ meta, DL⟩ , IDS);
add tuple ⟨ u, pointer⟩ to IDSRel;

The pseudo-code of the indexing process of a Web page is described in Algorithm 1. It takes the URL of a Web page (u) and the system's IDS data store (IDS) as input. Given a Web page's URL u, EIC checks whether the Web page is already indexed or not by querying the IDSRel relation to see if there exists a data tuple whose first element is u. If a Web page p has already been indexed, EIC then checks whether the last indexed result of p, i.e., p's IDS saved in the IDS data store, has expired or not. To do that. EIC retrieves p's IDS by first retrieving the pointer associated with the p's URL in IDSRel, and then using the pointer to locate the corresponding IDS in the IDS data store. In the pseudo-code, an IDS of some Web page is explicitly written as a tuple of its elements, ⟨ meta, DL⟩ , where meta is the metadata of the IDS including the Web page's URL and the timestamp of when the IDS was last generated, DL is a list of disambiguated company lists corresponding to the company lists extracted from the Web page.

If a Web page's IDS has already expired (i.e., a fixed time MaxTime has elapsed since the time when the Web page was last indexed), or a Web page has not been indexed before, the IDS generation process for this Web page is then triggered. First, to facilitate the operations in next procedures, the Web page's content and its source code is retrieved and parsed into a Document Object Model (DOM) by the Web page parser. Based on that, EIC 521 extracts all the company lists from the Web page and saves that to a list L. The details of the extraction of company lists from a Web page are not described here since there are existing methods that can be directly used. Briefly, in this simple embodiment, EIC detects both the HTML lists and textual lists (e.g., a list of items separated by some delimiters such commas, possibly ending with "and x" where x is a company name) contained in the Web page by properly leveraging some or all the following information: (i) repeated patterns discovered from the structures of the Web page's underlying HTML code or the Web page's elements' visual features, (ii) content redundancies between the Web page and its linked Web pages, (iii) domain-specific annotators for identifying entities in a Web page,) textual features such as POS (Part Of Speech) and delimiters, etc, for which existing methods in the art can be used. Then, all these lists are checked by some existing Named Entity Recognition (NER) tool (e.g., Stanford NER tool (https://nlp.stanford.edu/software/CRF-NER.html) to see whether a list is a company list or not. Here, the following simple criterion is used: if more than 80% of the elements of a list are recognized as company names by the NER tool, then the list is recognized as a company list. Lists that are not recognized as company lists are disregarded, and thus not kept by EIC, and will not be used in the subsequent computations.

For each company list extracted from the Web page, each of its elements, is disambiguated by DC 523 and each company list is converted to a disambiguated company list D($\mathcal{L}$) 550.

After that, an IDS consisting of the URL of the Web page and the the list of disambiguated lists is generated, and a timestamp of the time when the IDS is generated is added to its metadata. The IDS is saved in the IDS data store and is assigned a pointer pointer. Correspondingly, a tuple ⟨ u, pointer⟩ is added to the IDSRel relation. If it turns out that there is no company lists contained in the Web page, then DL is assigned a null value null.

Observe that in the indexing process 522, all company lists found on the input Web page are indexed, regardless of whether they mention the companies in the Current List or not. This makes sense, as the page index may be used also by future item set expansions (possibly by other users) with completely different seeds (and thus different Current Lists). In other embodiments, EIC 522 may only keep those lists that mention at least one company in the Current List.

Step-3: Collection of Candidates, 660
Algorithm 2 COLLECTCANDI(CL, u, IDS): from a Web page, collect competitor candidates for companies in the Current List.
input: CL—the Current List.
input: u—URL of a Web page.
input: IDS—IDS data store.
output: CANDI—CIDs of candidates extracted from the input Web page.

CANDI←∅;
pointer←getPointer(IDS.IDSRels, u);
⟨meta,L⟩←getIDS(IDS,pointer);
foreach $\mathcal{DL} \in$ L do
    if $(\bigcup_{\langle n,c\rangle \in \mathcal{DL}} z) \cap CL \neq \emptyset$ then
        foreach $\langle c, n \rangle \in \mathcal{DL}$ do
            if c≠null and c∉CL then
                CANDI←CANDI∪{c};
return CANDI After discovering and indexing relevant Web pages, candidate items 551 (here also called "candidates") are collected from each relevant Web page through the process described in Algorithm 2. The algorithm takes three parameters as input: the Current List 530 (CL), the URL of a relevant Web page (u), and the IDS data store 544 (IDS). All found candidates are stored in the set CANDI. Note that the CIDs of found candidates instead of their names are stored in CANDI.

First, the IDS (in form of ⟨meta, L⟩) of the Web page u is retrieved from the IDS data store.

Since not all the disambiguated company lists in a IDS are relevant to the Current List, before taking their elements as candidates, a proper analysis is performed to select only relevant lists while rejecting irrelevant ones.

In this embodiment, the relevance of a disambiguated company list DL is checked based on whether it contains any of the companies in the Current List. If DL does not contain any element of CL, it is disregarded ansd not used in the current item expansion computation.

For each single DL that contains some CIDs from CL, let CANDI(DL) denote the non-null CIDs of DL not contained in CL. Then CANDI is defined to be the union of all such sets CANDI(DL).

In another example, the relevance of a disambiguated company list DL is evaluated based on the size of the said intersection compared to the sizes of DL and the Current List. In yet other embodiments, each of those disambiguated company lists which do not contain any of the companies in the Current List may also be analyzed, and further utilized to discover more candidates, depending on how relevant it is to the Current List in terms of their latent semantic similarity. In some other examples, additional data of items in DI lists are extracted and utilized in next steps, as will be discussed herein.

Step-4: Selection of Proposed Competitors from Candidates.

Among all the candidates collected, the system then determines which ones are proposed to the user as likely competitors of companies in the list of seeds. Note that rules used in the inference process 561 described in this embodiment is a simple method of selection of likely competitors. In another more sophisticated embodiment, more complicated methods may be used, which will be discussed in the section of "Extensions, Variations and Refinements".

Here, a company A is considered to be a likely competitor of companies in the list of seeds as long as, for each company B in the list of seeds, A has at least one SIC-code being the same or compatible with some SIC-code of B. This is explicitly expressed by the domain-specific Prolog rules stated below.

This embodiment uses the following scheme for representing items as parts of logical facts: each item is represented as argument of a logical fact by its CID.

Related to this, the following types of facts corresponding to predicates CS and Comport are used. Logical facts CS(c, s) indicating that the CID c has a SIC-code s, and Compat(s, s') indicating that SIC-code s is compatible with SIC-code s', These facts are stored in the knowledge base and available prior to the expansion computation. The following further predicates (and corresponding facts) will be used during the expansion computation:

Seed, where Seed($CID_i$) means that $CID_i$ is in the disambiguated list of seeds. This predicate is straightforwardly computed from the disambiguated list of seeds and added temporarily in form of facts to the knowledge base. Seed is never changed by the rules $R_1$, $R_2$, $R_3$ below.

Candi, where Candi($CID_i$) means that $CID_i$ is in the candidate set Candi computed in Step-3. This predicate is added temporarily in form of facts to the knowledge base. Candi is never changed by the rules $R_1$, $R_2$, $R_3$ below.

New-item, where NewItem($CID_i$) means that $CID_i$ is a new CID that should be added into the Current List. This predicate is computed by the Prolog program below and added temporarily in form of facts to the knowledge base.

CompatCandidates, where
CompatCandidates($CID_i$, $CID_j$) shall mean $CID_i$ is compatible with $CID_j$, in the sense that $CID_i$ has an associated SIC-code that is compatible wit a SIC-code associated to $CID_j$. CompatCandidates is an auxiliary predicate computed by the Prolog program below.

a Bad, where Bad(c) shall mean a company with CID c is not a competitor of of companies in the Current List, and should not be added to the Current List.Bad is an auxiliary predicate computed by the Prolog program below.

Based on that, the following rules which are part of the rule base are used:

$R_1$: CompatCandidates(CID1, CID2):—
Candi(CID1),
CS(CID1, SIC1),
Seed(CID2),
CS(CID2),
NotEqual(CID1, CID2),
Compat(SIC1,SIC2)
$R_2$: Bad(CID1):—
Candi(CID1),
Seed(CID2),
not(CompatCandidates(CID1, CID2).
$R_3$: NewItem(CID1):—
Candi(CID1),
not(Bad(CID1)).

(Although negation is expressed as symbol \+ in modern Prolog interpreters, not(F) is used to express the negation of a logical fact F in this description for better readability.)

$R_1$ checks if a candidate $CID_1$ is a compatible with some other company $CID_2$ in the disambiguated list of seeds. It checks if there exists a SIC-code of $CID_1$ that is compatible with some SIG-code of $CID_2$.

By the Prolog interpreter, $R_1$ is automatically executed on each pair of <$CID_i$, $CID_j$> where $CID_i$ is a candidate being checked, $CID_j$ is an element of the list of seeds.

By Rule $R_2$, if $R_1$ does not report a positive result for some <$CID_i$, $CID_j$>, then $CID_i$ is inferred to be a bad candidate.

Finally, Rule $R_3$ defines as new items only those candidates $CID_i$, which are not "bad", and are thus share compatible SIC-codes with every CID in the disambiguated list of seeds.

After the execution of the Prolog program, the controller erases the old sub-list NewItems in the Current List, and append all new items to a new sub-list NewItems in the Current List. In summary, the engine executes the Prolog rules described above for all candidates to check if they are competitors of companies in the list of seeds. The Current List is then expanded by adding those candidates that have passed the checks, i.e. all CIDs C of the new facts Current (C) inferred by the rules $R_1$, $R_2$, and $R_3$.

If some new Current(C) facts are found, the Current List has been expanded to a larger list which may also contain some new companies that do not match the user intent and should be removed from the Current List. To this purpose, the Current List is displayed in the display area 640 of the system's user interface for the user to select 642 those wanted CIDs or un-select 643 those unwanted CIDs. Each CID in the Current List is displayed together with the company name and the textual description of each SIC category of its corresponding company. Any un-selected CIDs are removed from the Current List and the corresponding logical facts and will also be blocked from being added to the Current List in the future. In some embodiments, these un-selected companies are further utilized, such as being used as negative examples for the system to learn rules of rejecting similar companies, as will be discussed in the section of "Use of Machine Learning and Clustering Models in Addition to Domain Knowledge". In some other embodiments, the user interface allows users to rate items in the Current List. For example, users may give or select a score reflecting how well an item matches the user's intent.

Step-5: Repeat Step-2, Step-3, and Step-4 Until a Termination Criterion is Satisfied or the User Stops the Program.

The controller first erase all temporary logical facts, and then repeats Step-2 to Step-4, until a termination criterion, i.e., one of the following conditions is satisfied:

no new NewItem(C) facts are found in the latest execution of Step-4, the user indicates via the user interface that no further expansion of the Current List is desired, a total computation time limit which is a fixed parameter of the program has been exceeded, a total number of iterations which is a fixed parameter of the program has been achieved (in some sophisticated embodiment, it is dynamically determined based on various appropriate criteria), a predefined maximum size of the Current List which is a parameter of the program has been reached.

Extensions, Variations and Refinements

Extraction of More Comprehensive Information

Documents containing DI-lists usually contain valuable information about DI-lists and items contained in DI-lists. However, in the simple embodiment, only DI-lists are extracted from documents while the other useful information in the documents is not further explored. In more complicated embodiments, sophisticated information/data extraction techniques are used to acquire a more diverse set of information, leading to more informative pictures of DI-lists and items contained in DI-lists. Such additional information is beneficial to several sub-tasks of the list expansion computation, including the item sense disambiguation, analysis of DI-lists, rule-based inference process, and so on.

Various types of additional information may be extracted from documents according to different application scenarios. For example, in some embodiments, besides DI-lists and items contained in DI-lists, additionally extracted information may comprise one or more of the following:

1. Contextual information of each DI-list and contextual information of items contained in DI-lists.

2. Attributes of items (usually a pre-generated set of attribute names regulates a minimum set of attributes to be extracted) including:

(a) attribute values of said items according to the pre-defined set of attribute names, (b) new attributes and corresponding attribute values of said items, (here the term "new attributes" means attributes that are not included in the pre-defined set of attribute names at the time of extraction.)

Details of these types of information are described below.

Contextual information is the background information that provides a broader understanding of objects. It is a powerful tool for determining an object's themes and facets (e.g., properties and attributes). In the present description, the term "objects" means DI-lists or items contained in DI-lists. In documents where DI-lists are found, there is often a wealth of additional information providing context about DI-lists and items. Such contextual information supplements logical facts in the knowledge base with additional context to frame the understanding of DI-lists and items in a larger picture. In some embodiments, contextual information may be integrated with logical facts in the knowledge base and participate in context-aware analyses of DI-lists and items.

The concept of contextual information (a.k.a. context) has been widely studied and is essential in the field of Natural language processing (NLP) and Information/Data Extraction. Briefly, contextual information is the information that is locationally related to an object (e.g., the title of a DI-list on a Web page, which is part of the contextual information of items in the DI-list, is usually wrapped in an ancestor node of elements in the DI-list) or is semantically related to an object in a document. Contextual information may appear in different forms according to different types of documents where it resides. For example, on a Web page, contextual information of an object may be derived from one or more of the followings resources: (a) preceding nodes of an object that indicates the object's semantic meaning, such as a preceding node <h1>10 smartphones that sold most worldwide in 2021</h1> node of a DI-list, or a preceding node <strong> Manufacturer: </strong> of item "Apple"; (b) HTML tags of the object itself or HTML tags of the object's ancestors, which may imply the object's semantic meaning. For example, book titles or product names are often encoded using <h1>; (c) informative HTML attributes (e.g., class, id, itemprop, itemtype, and property) of different HTML nodes such as the object itself, the object's ancestors, siblings of the object, and siblings of those ancestors; (d) texts surrounding or containing the object.

The raw data of contextual information are extracted and associated with corresponding objects. In different embodiments, raw data of contextual information may be further processed and encoded in different ways according to different requirements of the respective computation processes. A simple possibility is to first individually encode each type of contextual information with separate neural networks and concatenate the derived results when necessary. Among different contextual information, those textual information (e.g., text contents of preceding nodes, texts surrounding or containing the object, HTML attribute values) may be encoded by neural sequence encoders such as char-level CNNs and word-level LSTMs, while those discrete information (e.g., tag names) may be encoded as one-hot embedding or its variants.

In some embodiments, besides contextual information, some items' new attribute values and new attributes are also extracted from documents containing their occurrences, or from documents related to the items, For example, attributes of a company item, Apple, may be extracted from documents containing the occurrences of "Apple", such as shopping Web pages that list products produced by Apple, or news articles that report on events involving Apple. In addition, attributes of Apple can also be extracted from other documents related to Apple, even if they do not explicitly mention "Apple", such as some Web pages on the official website of Apple.

In various embodiments, there may be two types of extraction processes: (i) the attribute-value extraction of items according to a pre-defined set of attribute names. Many ClosedIE and Supervised Web Data Extraction methods can be used. A simple example is to use pre-labeled examples <T, $\mathcal{A}$> indicating a text field T is a value of an attribute $\mathcal{A}$ train classifiers or wrappers to identify or extract more values of $\mathcal{A}$. In some embodiments, contextual information are used to enrich the encoding of each training example via a concatenation of the text's embedding and the embedding of different contextual information. Such enriched training examples enable a context-aware learner and can lead to better training results. (ii) the detection of the items' new attributes and the extraction of attribute values of detected new attributes. Many OpenIE and Unsupervised Web Data Extraction methods can be used. For example, an unsupervised learning method based on a document's underlying linguistic, structural, and visual regularities can detect text fields that are attribute values of some certain attributes. Each detected attribute value is then assigned an attribute label by some semantic annotator.

Additional Data

In various embodiments of the current disclosure, items participating in different analysis processes of the list expansion computation are enriched with additional data. Such additional data of an item comprise one or more of the following types:

(i) descriptive data, i.e., data that form a description or summary of characteristics of an item. Such data are selected from some existing knowledge bases (that could be part of or linked to the system's KB) or extracted from documents containing occurrences of the item. For example, in a document containing the occurrence of an item "Apple", the raw descriptive data may be extracted as "Apple is an American multinational corporation that designs and manufactures consumer electronics and software products", which may be further processed by other processes.

(ii) properties and attributes of an item. Each property or attribute has either a single value or a list of values. For example, the properties and attributes of an item "Apple" may comprise: (a) NAME of which the value is a set of different names of the Apple company such as "Apple Inc.", "Apple Computer, Inc.". (b) NASDAQ of which the value is a unique NASDAQ code: AAPL, (c) LOCATION of which the value is a set of locations of Apple stores, and so on.

(iii) contextual data, which is detailed in the section of "Extraction of more comprehensive information".

(iv) relational data that describes relationships between an item and other objects (e.g., other items, documents, or DI-lists). In some embodiments, a relation of a type R between two items o and o* co-occurring in a document D is stored as a logical fact: R(o, o*, D). For example, relational data of "Apple" detected on a Web page p containing a list of different phone brands and their products are the following: (1) Sibling(Apple, Samsung, p), where the predicate Sibling indicates that Apple and Samsung are occurring as siblings in the DOM of Web page p. (2) Descendant(Apple, iPhone12, p), where the Descendant indicates "iPhone 12" occurs in a descendant node of the occurrence of "Apple" in the DOM of Web page p.

(v) relevance data, e.g. numerical data expressing the degree of relevance of an item, calculated by statistical methods illustrated in the section of "Use of Statistical and Probabilistic Models in Addition to Domain Knowledge", (vi) statistical data, e.g., how often an item occurs in a DI-list, the position of an item in each DI-list containing it, and other statistics, calculated by statistical methods illustrated in the section of "Use of statistical and probabilistic models in addition to domain knowledge", (vii) metadata that comprises information about various aspects (but not the content or semantic) of an item, such as a link to a document from which the item is extracted, the timestamp of when the item is extracted, at which stage of the whole list expansion computation the item is detected, and so on.

Knowledge of User Intents

In some systems embodying the present disclosure, the domain-specific knowledge repositories contain the user-intent ontology, i.e., knowledge about different user groups and the corresponding user intents. For example, in the Companies domain, the the user-intent ontology contains user groups including (1) customer/client (2) competitor (3) supplier (4) job-seeker, and so on. These user groups are associated with different user intents. For example, the user group of customer/client may be associated with the user intent of "identifying companies that create products comparable to those made by the seed companies". These systems that utilize the user intent ontology could contain subsystems designed to cater to each user group. A user has the option to choose a subsystem that suits their user group, or they can specify their user group on the system's user interface, which then directs them to the relevant subsystem.

An example of the previously mentioned subsystems operates as follows. If the user group is identified as "customer/client", the corresponding subsystem will determine the user intent to be "identifying companies that create products comparable to those made by the seed companies", based on the user intent ontology. This user intent is then further refined based on the similarities among the seed products, taking into account the attributes that are relevant to the user intent. In this case, attributes related to product similarities are analyzed. As an illustration, a refined user intent derived from the seeds (Nikon, Cannon, Fujifilm) would be "identifying companies that manufacture digital cameras comparable to those produced by Nikon, Cannon, and Fujifilm", given that these seed companies all make digital cameras. When there are multiple possible refined user intents, the system may prompt the user to choose from the different options. For instance, if the seeds are (Sony, Apple, Huawei), the refined user intents could be "identifying companies that create laptops comparable to those produced by the seed companies" or "identifying companies that create smartphones comparable to those produced by the seed companies". The system may request the user to pick the appropriate refined user intent. In a some simpler embodiment, the system could simply generate an expanded item set for each possible refined user intent. The refined user intent will then be represented as logical facts and participate in the system's reasoning process.

Knowledge of Item Senses

In some systems embodying the present disclosure, the domain-specific knowledge repositories contain knowledge about specific typical item senses in a domain. Different senses of an item are usually related to interests of users with different user roles.

Here the term "senses" of an item has a similar meaning to the "word senses" in linguistics (https://en.wikipedia.org/wiki/Word_sense), but refers specifically to the item's meanings in a particular domain. For example, in the "Companies" application domain, since a user role may be supplier, employee, customer, etc, accordingly, a sense of company "Apple" may be mobile-phone manufacturer, employer, or mobile-phone seller. Such knowledge is called knowledge of senses arid is saved in domain-specific repositories.

In some embodiments, the knowledge-based representation of a sense comprises the label (a unique id or a text label) of a sense, and one or more of the following associated information: (i) a sense's associated keywords (a.k.a. gloss), i.e., keywords that occur frequently in documents mentioning the sense, for example, keywords of a sense "mobile phone seller" may be: phone, model, price, 5G, battery, screen, best seller, and so on, (ii) a binary classifier which classifies whether the meaning of an item in a specific context equals to the sense or not. Optionally, there can be an additional multi-class classifier which classifies the meaning of an item in a specific context as one of the senses in the knowledge base or as a null value null indicating "No matched sense".

Item Sense Disambiguation

At various stages of the list expansion computation, different decisions based on item senses need first to solve the Item Sense Disambiguation problem. The Item Sense Disambiguation problem is concerned with understanding the sense of an item in a particular context when the item has multiple meanings.

Different methods of item sense disambiguation may be used in different systems embodying the present disclosure. Such methods may involve one or a combination of techniques from a group of disambiguation techniques comprising:

(i) Word Sense Disambiguation (WSD) techniques based on Natural Language Processing (NLP) methods, such as supervised WSD methods that frame the WSD task as a classification problem. For a particular domain, some domain-specific training examples (i.e., items and their corresponding contextual data in different documents) are pre-annotated with sense labels, and a classifier is trained to learn the association between an item in a particular context and its sense.

(ii) Unsupervised machine-learning methods for WSD. Unlike supervised WSD methods, which assign sense labels to items, unsupervised WSD approaches cluster items with similar senses into sense clusters. Many existing clustering-based WSD methods can be used, such as context-based clustering methods, that perform clustering of items based on representing items as context vectors converted from items' contextual data. To build a context vector of an item, knowledge of senses stored in the system's knowledge base (as described in the section of "Knowledge of item senses") is first used to detect sense-relevant keywords in the context data of the item. Then a context vector is built via a normalized average of the vectors of detected sense-relevant keywords. Each derived cluster is assigned a sense label based on the sense-relevant keywords of items it contains. For example, if the contextual data of most items in a cluster C contain keywords relevant to a sense S, then C is considered to be a cluster of items of sense S. This is just a simple example, and a myriad of other useful embodiments involving different information in the knowledge base to improve the clustering can be built according to the present disclosure. For example, in another embodiment, an improvement to the clustering process is as follows. Before a clustering process starts, knowledge of different senses saved in the knowledge base is used to assign labels to items via a rule-based annotation process. An item may be associated with multiple sense labels that reflect the item's possible meanings. These labels, further used as item features, enrich the information used in the clustering process and thus improve the clustering results.

(iii) Ontology-based disambiguation approaches that employ topological analysis and logic-based methods (e.g., a method that evaluates the commonality of semantic correlations among a set of items and uses that to disambiguate item senses), or various graph algorithms (e.g., random walks, clique approximation, game theories) on a semantic network (e.g., a knowledge graph).

(iv) Rule-based disambiguation techniques, which are particularly useful to mapping an item to a unique real-world entity (e.g., mapping a company name to a real-world company). Many rule-based methods in the fields of Entity Resolution and Duplicate Record Detection can be used, such as those methods that require human experts to meticulously craft matching rules upon different attributes of the entities, or those semi-automatic approaches that first automatically learn rules from training data and then ask human experts to manually tune the automatically generated rules.

In some embodiments, when the item sense disambiguation process fails to produce a unique sense of an item in a particular context, a user is expected to help decide the sense of the item in this particular context. To that point, the system displays item-context-sense records on the user interface. Each item-context-sense record consists of an item, some of the item's contextual data, and a possible sense of the item. For example, if the item sense disambiguation process fails to decide what "Apple" means on a Web page with URL u, the system displays item-context-sense records on the user interface, such as: <Apple, "laptop brand">, <Apple, u, "cell phone brand">. The user then helps choose a unique record by accepting or rejecting these item-context-sense records. In some embodiments, user feedback is also used in the item sense disambiguation process. For example, accepted and rejected item-context-sense records may be further used as positive and negative examples by the supervised methods mentioned above. In some other yet simpler embodiments, those items for which the item sense disambiguation process fails are excluded from further computations.

In some embodiments, item sense disambiguation techniques may also be used to determine the senses of documents and DI-lists. Here the problem of sense disambiguation of a document or a DI-list is, in its essence, the task of discovering the central theme or the main topic of a document or a DI-list. All aforementioned methods can be adjusted or further extended and/or combined to solve this problem.

The sense disambiguation of each document and each DI-list is also helpful to several steps of the list expansion computation process. For example, the Prolog program used at Step-4 in the simple embodiment can be further enhanced by incorporating the following two new rules based on the topics of DI-lists.

$R_4$: IrrelevantListTopic(T):—
    ListTopic(LT),
    NotEqual(CID1, CID2),

Contain(L, CID1),
Bad(CID1),
Contain(L, CID2)
Bad(CID2),
$R_5$: Bad(CID):—
Candi(CID),
Contain(L, CID),
ListTopic(L,T),
IrrelevantListTopic(T).

New predicates used in rules $R_4$ and $R_5$ are explained as below:

ListTopic, where ListTopic(L,T) means that the main topic of a DI-list L is topic T.

Contain, where Contain(L,CID) means a DI-list L contains the occurrence of the corresponding company of CID.

IrrelevantListTopic, where IrrelevantListTopic(T)

means a topic T is a topic irrelevant with the user intent.

$R_4$ checks if a list topic T is an irrelevant topic by checking if there exists a DI-list which has the T as topic and contains two candidates already recognized as unsuitable, i.e., "bad". (This is a simple, and somewhat naive example for illustration purposes. In yet more complicated embodiments, $R_4$ may be expressed as a fuzzy rule based on the portion of bad candidates.) $R_5$ determines that a candidate CID is "bad" if it occurs in a DI-list whose topic is irrelevant.

These two new rules can be integrated with $R_1$, $R_2$, and $R_3$ in the simple embodiment and form a enhanced Prolog program to be used at Step-4 of the simple embodiment.

In other embodiments, the topics of DI-lists and documents may be further utilized at various steps of the list expansion computation.

KB Update and Knowledge Graph Enrichment

In various examples, the Knowledge base used for item set expansion is updated by some processes that are part of the expansion computation. This can be illustrated, where a competitor knowledge graph (such as Owler's Competitive Graph) is part of the KB. This graph already contains a list of known competitors for many companies. For a given company C, the name (or CIDs) of C together with the names (or CIDs) of these competitors are used as seeds for an item expansion process. If the expansion computation finds new competitors to C, the knowledge base can be updated with those competitor relationships by associating all new competitors to C, and, vice-versa, by associating C to all competitors. Given that the updated part of the knowledge base is, in this case, because Owler is a knowledge graph, a so-called knowledge graph enrichment has been achieved. This is an example, and other useful examples involving different types and uses of updating knowledge bases and/or enriching knowledge graphs via item set expansion exploiting both domain-specific rules and co-occurrence of items in DI-lists can be built according to the present disclosure.

Use of Statistical and Probabilistic Models in Addition to Domain Knowledge

Many existing methods use mainly or solely statistical and/or probabilistic models for item set expansion, To anybody skilled in the art, it will be dear that such methods can be combined with the teachings of the present disclosure so to obtain improved results.

One simple possibility is to apply such methods to extract better-suited candidate items from relevant documents. For instance, an on-topic model can be used to consider only those DI-lists in a Web document (via its corresponding IDS) that have a high "on-topic" probability (with respect to the input seed list) according to a list classifier. Moreover, only items which have a high "on topic" weight may be further considered, and so on. A further improvement may also take into account items un-selected by a user: they could be taken into account by the functions computing on-topic and off-topic probabilities. In similar and in various other ways, other methods may be used to select better items, and thus eliminating noise in combination with item selection methods that are based on domain-specific rules and logical inference. More generally, statistical or probabilistic degrees of appropriateness may be calculated that take into account one or more if the following aspects, possibly among other aspects and/or parameters:

statistics about the frequency of occurrence of an item in DI-lists, the degrees of relevance of the DI-lists in which an item occurs, the degrees of relevance of the pages on which said item occurs in some DI-lists, the degrees of relevance of how said item relates to items of the Current List, contextual information based on natural language processing, attribute-values of said item that appear with together with said item in a DI-list, rules from the knowledge base that compute numerical values related to the appropriateness of said item.

statistics related to keyword frequency.

Use of Machine Learning and Clustering Models in Addition to Domain Knowledge

Similar to statistical and/or probabilistic methods, various machine learning methods may be used. Machine learning may be used at various stages of the item set expansion process, and even as a pre-compilations step in order to compute some relevant knowledge. For example a fuzzy similarity relation (e.g. for SIC-code compatibility) may be obtained via machine learning from an existing verified competitor knowledge graph. Machine learning may also be used for classifying documents according to topics or "senses" that are stored together with company names in the knowledge base, and, for example, help selecting only those documents returned by a search that match the topics of the seed items. Machine learning based NLP techniques may also be used. For example, pre-trained language models (such as BERT) can be utilized to better understand the user intent, by generating candidate class names of seeds. Skip-gram context features and embedding features may be combined to better score and rank items based on their relevance with the user intent.

Automated clustering (short: "clustering") methods are often considered as techniques in their own right, but many of these can also be regarded as unsupervised machine learning methods. Clustering techniques can help at various stages of the item set expansion process. Assuming there is a semantic similarity relation among companies (e.g. having compatible SIC-codes), item candidates for expanding a seed list may be clustered, and only those clusters of items close to the seed set may be further considered. Similarly, via clustering techniques, multiple semantic facets of the input seed list can be discovered, and multiple answers are clustered around each facet.

Clustering methods may also be used to disambiguate user intent. If a seed set or a candidate set gives rise to several clusters, the system may select and propose to the user a small set of "test items", at least one per cluster, such that each test item appears in as few as possible clusters (ideally, in only one, if possible). Users may un-click those test items that do not match their intent, and the clusters in which the un-clicked items appear are disregarded for the rest of the computation or receive a lower weight.

Machine-learning and clustering can also be combined with rule-based inference, by first annotating objects (e.g. items) via, say, domain-dependent rules, and then applying the learning algorithms to the annotated objects. For example, objects may be annotated via rules with ontological categories.

Similarity Knowledge

In some examples, similarity relations between objects of interest are important ingredients of knowledge-based itemset expansion. Sometimes, similarity relations are explicitly given, sometimes they have to be computed from other relations or other data. As an example, the similarity relation Compat over SIC-codes is explicitly given and is directly used by Rule $R_1$. However one could also use compat to define a compatibility relation CompatItems over items:

CompatItems(CID1,CID2):—
    CS(CID1,SIC1),
    CS(CID2,SIC2),
    Compat(SIC1, SIC2).

To make the example less trivial, in a different example, one may assume that there is a relation Keyword such that a fact (or equivalently, a tuple) KeyWord(CID, K) means that K is a keyword associated with a company identified by its CID. One may then require that in order to be compatible, two companies also need to have at least one common associated keyword. The CompatItems rule would then be:

CompatItems(CID1,CID2):—
    CS(CID1,SIC1),
    CS(CID2,SIC2),
    COMPAT(SIC1, SIC2),
    KeyWord(CID2,K)
    KeyWord(CID2,K).

Note that in the above used knowledge representation, one may consider SIC-code and KeyWord to be a multi-valued attributes of CID items, and there is a similarity relation for SIC-Codes which is Compat, and a similarity relation for keywords which is (in this case) the identity. In another example, instead of the identity, one may use the synonymy of keywords.

Similarity relations are in most cases reflexive and symmetric, but often not transitive, and are thus not equivalence relations in the mathematical sense. A similarity relation can be used for clustering. While for an equivalence relation the clusters are simply the equivalence classes, for a reflexive and symmetric similarity relation $\mathcal{R}$, the clusters are constituted by the maximal cliques of the graph on the graph corresponding to $\mathcal{R}$. In various environments such maximal-clique clusters can be used for all tasks where clustering is relevant, in particular also for user intent disambiguation (for example, as described above).

As an example, instead of a crisp similarity relation, a more expressive fuzzy similarity relation may be more appropriate. The maximum-clique clustering method can be suitably adapted to this setting. The version of maximum-clique clustering for fuzzy similarity relations can then be used.

In further environments, the objects in a set O of items or other entities may have have various associated (possibly multi-valued) attributes $A_1, \ldots, A_k$. Similarity relations may be available, or can be defined, for the attribute values of each attribute. From these, one can define, via a numerical function a fuzzy similarity relation among the objects of O. In many cases, the definition of these similarity relations, for the attributes and for O, may considered to be knowledge, and the similarity functions may be stored in a rule base that is part of the knowledge base, for example, in form of logical rules extended by arithmetical functions and/or fuzzy features. Some or all of these rules may be application-specific.

Search Refiners

In some examples of the present disclosure, users are allowed to add search refiners to the list of seed items given in input. Search refiners are optional syntactic constructs that can be specified with the search terms (i.e., the seed items) which indicate some desired restriction of the search.

A first group of search refiners are referred here as "retrieval refiners". They refine the document retrieval. A well-known example of search refiners are Google search operators (See https://www.indeed.com/career-advice/findi ng-a-job/google-search-operators for a list and explanation of Google search operators). For example, putting a word in double quote forces Google to search for this exact word, while putting a minus in front of a word tells the Google search engine to suppress pages in which this word occurs. Retrieval refiners can be very useful as user-supplied upfront help to sense disambiguation in item set expansion. An example may allow a user to use search operators corresponding to a used search engine to constrain the document search, and thus output more relevant documents only.

In addition to retrieval refiners, another type of search refiners, referred-to as "list refiners" may be used. List refiners are syntactic constructs that impose constraints on the lists (occurring in documents) to be taken into consideration. In one example list refiners may have the same syntax as retrieval refiners, except that they have to be written in square brackets. For example, considers the seeds "apple" and "blackberry", then this list could be augmented as follows with both retrieval refiners and search refiners:

+apple blackberry−fruit[−Google]

This expresses that the system should look for documents (e.g. Web pages) that must contain the word "apple", preferentially also "blackberry", do not contain the word "fruit", and in such documents, only lists that do not contain the word "Google" should be considered. It is obvious that also list refiners can be very useful.

EXAMPLE

This section features an example that illustrates why statistical or probabilistic methods alone are not sufficient for item set expansion as they may fail to interpret the user intent correctly, and it is also illustrated how knowledge can come to the rescue.

The item set expansion problem, in its essence, is to expand a list of seeds to further items that match the user intent. There are two main challenges in solving this problem. First, it is usually difficult to interpret the user intent based on a list of seeds. This challenge arises when the seeds have more than one feature in common, and the user intent can thus be interpreted via different subsets of these common features. Second, even if the user intent has been determined, the documents from which new items are to be extracted may be about various topics. It is difficult to make a system decide which of those items contained in DI-lists in such documents precisely match the user intent. Here a real-world example is presented to illustrate these two main challenges of the item set expansion problem. In the example, a list of seeds: [Sony, Apple] is given by some user, the document repository used is the Web, and Web lists (including HTML lists and textual lists) are used to discover other items that match the user intent.

Sony and Apple are two companies that have many features in common. Both companies produce and sell electronic products of similar categories, including cell phones, earphones, laptops, tablets, smartwatches, etc. They also have similar software products such as music stores. Both companies are pioneers in developing smart vehicles. As successful enterprises, both companies have gone public and are attracting investors on the stock market. As employers, both companies are actively hiring software engineers. Since both companies have global businesses, they both have offices in the US, the UK, China, and many other countries. They have many further common features. All these common features make it hard to interpret what the actual user intent is: a user intent may be related to one or a combination of these common features. For example, a user may want an expanded set of companies selling earphones; another user may want an expanded set of companies selling smartwatches. In more complicated examples, a user who is an investor may want to find a set of companies that have gone public and are developing intelligent vehicles; a software engineer looking for a new job may want to find a set of companies that produce smartphones and have offices in the UK. A simple method of determining the user intent is adopting the most general common feature (such as summarising the seeds as "big companies in electronics" in this example) to interpret the the user intent, as some existing methods do. Such methods usually do not produce results that precisely match the user intent.

A second problem is that the DI-lists on documents from which new items are extracted during the expansion process may be related to very different topics, several of which may not be related to the user intent. Evidence for this is given in the following experiment. Assume it is known that the user wants to find companies selling cell phones. Using the Web as the document repository, a search engine API (Bing Web Search API, version: v7, search execution time: 14 Feb. 2022) uses the query of "Apple AND Sony" to search the Web for Web pages that contain both of Apple and Sony. Among the first 200 search results, there are around 31 Web pages containing the co-occurrences of Apple and Sony in a HTML list or a textual list. Most of these DI-lists contain many other companies. However, not all these DI-lists are useful as several of them present topics that are not related to the user intent. As shown in the table below, there are around 9 different topics, among which only one topic ("cell phones") directly matches the user intent, while other topics are either partially relevant (e.g., "shopping websites with lists about different product types") or completely irrelevant (e.g., "smart vehicles").

| topic | #pages |
| --- | --- |
| shopping websites with lists about different product types | 5 |
| brands of products at sale | 2 |
| cell phones | 8 |
| music stores | 1 |
| earbuds | 9 |
| laptops | 2 |
| smartwatches | 1 |
| smart vehicles | 3 |

Conventional solutions described in the literature may not solve this problem well due to their limitations, as described in the section of "Background References". For example, approaches based on items co-occurrence statistics prefer items that frequently co-occur with the seeds on different Web pages. In the present example, such methods may mistakenly choose irrelevant items such as Bose, a company that sells earbuds but not cell phones. Although Bose co-occurs with the seeds in DI-lists on 7 Web pages, which is a lot, all these Web pages are about "earbuds", a topic irrelevant to the user intent. As an example, to remove irrelevant items, a user is asked to un-select those companies (such as Bose) that do not match the user intent from the Current List. A further improvement that minimizes required help from the user is described below.

The problem described above is essentially caused by the topic variety of those Web pages containing occurrences of all seeds. Recall that in existing methods, those Web pages containing occurrences of a subset of items in the Current List are also explored. In the expansion process based on such Web pages, similar problems as described above may also arise. For example, assume that at some stage of the whole list expansion computation, the Current List contains CIDs of Apple, Sony, and LG. To discover more items (that improve the recall of the list expansion result), Web pages containing a subset of the Current List are further utilized. Taking a subset with elements of LG and Sony as an example, most Web pages containing LC and Sony are about televisions. All items discovered in these Web pages about televisions are producers of televisions, which are entirely irrelevant to the user intent. However, in such cases, a television producer such as vizio (Vizio is a company that designs and sells televisions, sound bars, viewer data, and advertising, https://en.wikipedia.org/wiki/Vizio), which co-occurs with LG and Sony on several Web pages about televisions, may still be added to the expansion result by approaches based on item co-occurrence statistics.

Here, domain-specific knowledge comes to the rescue. To see how this works, one example is described below. In the example described below, newly added rules are integrated with rules $R_1$-$R_3$ and work together as an enhanced Prolog program to be used in Step-4. Other steps described remain the same and are thus not illustrated here again. Although rules $R_4$ and $R_5$ described in the section of "Item sense disambiguation" are not included in the example described below, they may also be combined with rules $R_1$-$R_3$ and rules described below in other examples.

Recall that the example defined facts Bad(c) which express that a CID e should not be added to the Current List. Assume that C1150 is the CID of Vizio. Unfortunately, Bad(C1150) is not derived by the rules, The example thus expands the Current List with C1150, which clearly demonstrates a lack of precision. Although a user is asked to un-select companies that do not match the user intent at Step-4 of the example, by which a fact Bad(C1150) can be asserted, it is always more desirable to automatically and precisely derive such facts rather than requiring the user's help. Below it is shown how, by using further domain-specific facts and rules, another example achieves a higher precision via a further rule for inferring Bad atoms by which it actually derives Bad(C1150).

First of all, observe that company SIC codes are used in the example for the only purpose of illustrating how logical-facts-based rules can be used in the list expansion computation. However, rules purely based on SIC-codes are not enough in the present example. First, SIC-codes cannot precisely reflect the user intent. Neither the SIC-codes of Apple (3663 (3663-Radio and Television Broadcasting and Communications Equipment), 3571 (3571—Electronic Computers)) nor the SIC codes of Sony (3651 (3651—Household Audio and Video Equipment), 5064 (5064—Electrical Appliances, Television and Radio Sets)) indicate whether or not Sony or Apple sell cell phones. Second, SIC-code based rules ($R_1$-$R_3$) cannot thoroughly eliminate all companies that do not match the user intent. For example, the SIC-code of Vizio, 5731 (5731—Radio, Television, and Consumer Electronics Stores), is compatible with SIC-codes of Apple and Sony.

In the improved solution presented here, besides SIC-codes, domain-specific knowledge such as additional data as described in the section of "Additional data" related to each candidate are utilized in the rule-based inference processes. Specifically, product type information is used in this example.

In particular, in this example, the domain-specific knowledge repository also contains facts of the form HasProdType (CID, P) indicating that CID has a product type of P. Based on such logical facts, new rules can be generated, such as rules requiring that a company to be added to the Current List should have at least one same product type as all seeds.

As listed below, $R_6$ and $R_7$ are responsible for finding the seeds' common product types. In detail, $R_6$ labels a product type P (stored as a logical fact ProdType(P)) as irrelevant (denoted by IrrelevantProdType(P)) if there is some seed which does not produce products of product type P. A product type which is not labeled as irrelevant after the execution of $R_6$ regarding all seeds is then a common product type of all seeds, denoted as CommonProdType(P1) (as described in $R_7$).

Based on that, $R_8$ and $R_9$ detect those bad candidates that do not produce products of any of the common product types, where GoodCandi(CID) means a company with company ID of CID produces products of at least one of the common product types.

$R_6$: IrrelevantProdType(P):—
Seed(CID),
ProdType(P),
not(HasProdType(CID,P)),
$R_7$: CommonProdType(P):—
ProdType(P),
not(IrrelevantProdType(P)).
$R_8$: GoodCandi(CID):—
Candi(CID),
HasProdType(CID, P)
CommonProdType(P)
$R_9$: Bad(CID):—
Candi(CID),
not(GoodCandi(CID)).

$R_6$ to $R_9$ ensure that a company to be added into the Current List produce products of at least one of the seeds' common product types. By integrating these rules with rules described in Step-4 of the example, more irrelevant items can be further detected, and a higher precision can thus be achieved. For example, a new fact Bad(C1150) is derived by these rules, since vizio does not produce any of the common product types shared by Sony and Apple.

Finally a further improvement is illustrated featuring yet another rule for inferring additional facts of type Bad(CID). As already described in the example, in Step-4, in order to select items that exactly match the user intent, a user is asked to un-select items that do not match the user intent. Each un-selected item CID is recorded as a logical fact of the form Bad(CID). In the example, clustering methods (as described in the section of "Use of machine learning and clustering models in addition to domain knowledge") are used to reduce the required user interactions. First, candidates are clustered based on their additional data. Clustering results are stored as logical facts Cluster(C, CID) indicating candidate CID is a member of duster C. Then, the most informative examples are selected by active-learning based methods, and are presented to a user to get feedback. After the user feedback process, $R_{10}$ is triggered to propagate the user's preference (e.g., an un-selected CID2) to other items in clusters containing CID2. For example, a user may un-select the company Bose, and then each company CID1 in clusters containing Bose is regarded as irrelevant with the user intent, leading to a new logical fact Bad(CID1). These newly discovered logical facts are then fed into all rules to trigger a new round of recursive rule executions.

$R_{10}$: Bad(CID1):—
Candi(CID1),
Bad(CID2),
Cluster(C, CID2),
Cluster(C, CID1).

This was just a simple example to illustrate how a combination of domain-specific knowledge and rule-based inference can lead to a more accurate list expansion computation, Many other examples according to the present disclosure can be built to achieve yet better solutions of the item set expansion problem.

As a final note, observe that for a wide set of uses of item set expansion in the context of companies, the requirement that a new company to be taken in consideration for list expansion must produce at least one product of a product type common to all seed companies is very reasonable. Of course, this requirement makes the item expansion process more specific, in that it is now suitable only for users looking for companies that compete over products of the same type. It is, for example, no longer suited for discovering competitors on the stock market such as, say Apple and Pfizer. There is nothing bad with this, because domain-dependent item set expansion is, by definition, not general, and applications can be limited in various ways (here, by excluding stock-market competition, and probably a bunch of other applications). However, a more general system can often be obtained via a knowledge-based combination of multiple more specialised systems, where the seed items are first submitted to a knowledge-based analysis, and based on this analysis it is decided which of the more specialised systems should be used.

For example, assume that, in addition to a product-based items expansion system as above, say "System P", also a stock-market based item set expansion system say, "System S", is available. Then a simple item set expansion system, "System PS", that combines System P with System S could be obtained as follows. System PS, when a given seed list is input, would first use knowledge to determine the answers to the following two questions:

Q1 Do all seeds share a common product type?
Q2 Do all seeds correspond to companies that rank comparably on the stock market?

Assuming q1 and q2 are Boolean variables describing the answers to Q1 and to Q2, respectively, System PS would act as follows:

1. IF q1 and not q2 THEN invoke System P; RETURN;
2. IF q2 and not q1 THEN invoke System 5: RETURN;
3. IF q1 and q2 THEN invoke System P and store the results in list R1; invoke System S and store the result in list R2; output a suitably ordered list of common elements of R1 and R2;
4. If not q1 and not q2 then ask user to replace seeds.

The above describes a very simple way of combining two more specialised systems to a more general one. Of course, step 4 could do various other actions. The goal here was only to illustrate how such a combination can, in principle, look like.

The system may include a computing system, which can be for example any computing device, or any component thereof in which the components of the system are in communication with each other using a connection. The connection can be a physical connection via a bus, or a direct connection into a processor, such as in a chipset architecture. The connection can also be a virtual connection, networked connection, or logical connection.

In some embodiments, the computing system is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example system includes at least one processing unit (CPU or processor) and the connection that couples various system components including system memory, such as read-only memory (ROM) and random access memory (RAM) to the processor. The computing system can include a cache of high-speed memory connected directly with, in close proximity to, or integrated as part of the processor.

The processor can include any general purpose processor and a hardware service or software service, such as services stored in storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

To enable user interaction, the computing system includes an input device, which can represent any number of input mechanisms, such as a microphone for speech, a touch-sensitive screen for gesture or graphical input, keyboard, mouse, motion input, speech, etc. The computing system can also include an output device, which can be one or more of a number of output mechanisms known to those of skill in the art.

In some instances, multimodal systems can enable a user to provide multiple types of input/output to communicate with the computing system. The computing system can include a communications interface, which can generally govern and manage the user input and system output. There is no restriction on operating on any particular hardware arrangement, and therefore the basic features here may easily be substituted for improved hardware or firmware arrangements as they are developed.

A storage device can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device can include software services, servers, services, etc., that when the code that defines such software is executed by the processor, it causes the system to perform a function. In some embodiments, a hardware service that performs a particular function can include the software component stored in a computer-readable medium in connection with the necessary hardware components, such as the processor, the connection, the output device, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on, The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

These and other objectives and features of the invention are apparent in the disclosure, which includes the above and ongoing written specification.

The foregoing description details certain embodiments of the invention, It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

The invention claimed is:

1. A method comprising:
receiving, by at least one processor, a list of seed items belonging to a same application domain; and
expanding, by the at least one processor, the list of seed items to include items that:
  (i) are similar or related to seed items, and
  (ii) co-occur with one or more seed items or and/or one or more already computed further items in one or more lists of items, comprising "Document Item Lists" ("DI-Lists"), each being part of an electronic document from a computer-retrievable electronic document repository, and
  (iii) are selected by a process involving statistical evaluations and processing of factual knowledge and rule-based knowledge, the rule-based knowledge involving one or more rules expressing application-domain specific knowledge;
the method further comprising:
  (1) a knowledge base, accessible by the at east one processor, the knowledge base storing in permanent and/or non-transitory memory facts and rules, the knowledge base comprising a plurality of application-domain specific facts, and zero or more application-domain independent facts, one or more application-domain specific rules related to the application domain, and zero or more application-domain independent ("general") rules,
  (2) inferring, by the at least one processor, new facts from a given set of facts using an inference engine that uses at least one rule from the knowledge base, and
  (3) expressing items, relationships among items, and relationships between items and their attributes as facts,
where
  (i) the facts are represented as logical atoms and/or as relational data tuples that are interpreted by the inference engine as logical atoms, and/or as data structures in a programming language that are interpreted by the inference engine as logical atoms,
  (ii) the rules represent logical inference rules having a rule body and a rule head,
  (iii) all seed items have a type, known as "Input Item Type", and
  (iv) the document repository comprises a search functionality which, for a given set of items, searches and retrieves documents containing these items.

2. The method of claim 1 further comprising performing a list expansion computation comprising:
  (a) accepting as input the list of seed items,
  (b) maintaining and expanding a list of current items, referred to as a "Current List", the Current List being initially determined from the list of seed items, where all items in the Current List have an associated item name and where the item name is of the Input Item Type, and where at least one of:
    (i) the type of each current item is the Input Item Type, and the item name associated with each current item is the current item itself,
    (ii) each current item is an item identifier (item ID) linked in the knowledge base to the item name and to additional data being part of or related to the item, and
    (iii) each current item type is a record having as one component an item name, and as other components additional data being part of or related to the item,
  (c) using the inference engine to infer new facts from existing facts in the knowledge base and adding the new facts to the knowledge base,
  (d) analyzing the Current List and selecting one or more sub-lists from the Current List,
  (e) for each selected sub-list, selecting or retrieving an associated ordered set of zero or more documents from the document repository, such that at least one item of the sub-list occurs in each document of the associated ordered set,
  (f) for each selected sub-list, analyzing each document of the associated ordered set by identifying, where possible. DI-lists that contain one or more items from the sub-list,
  (g) analyzing and selecting at least one DI-List,
  (h) analyzing items in the at least one DI-List and selecting new items from the at least one DI-List, and expanding the Current List by adding for each selected new item a corresponding current item to the Current List,
  (i) iterating a computation that uses one or more of the above (c)-(h) until at least one of the following termination criteria applies:
    the list expansion computation cannot derive any further new item,
    a statically given maximum number of iterations has been performed,
    a dynamically determined maximum number of iterations has been performed, and
    the list expansion computation is terminated by user interaction, whereby, at the end of the iterative computation, the resulting Current List comprises a final expanded item list output or returned,
  where at least one of the (d)-(i) is supported or performed by the inference engine operating on the knowledge base, using at least one domain-specific rule from the domain-specific rules of the knowledge base, and
  where the list expansion computation is controlled by a controller, the controller organizing and controlling the execution of actions, tasks and/or modules.

3. The method of claim 2 where the dynamically determined maximum number of iterations computed is determined based on at least one of:
a maximum number of new items to be computed,
a maximum number of documents to be retrieved, and
a runtime limit.

4. The method of claim 2 where the Input Item Type comprises at least one of:
  (a) a single word,
  (b) a combination of words,
  (c) an item identifier, (d) a logogram,
(e) a combination of logograms,
(f) a Web link (URL),
(g) a hypertext link,
(h) a picture provided directly,
(i) a picture provided via a link, and
(j) an item descriptor.

5. The method of claim 2, where the analyzing of the at least one DI-list assigns a degree of relevance to each assigned DI-List, and where the degree of relevance of an analyzed DI-List is used to determine whether the DI-List should be rejected, and if so the DI-list will be disregarded, or accepted, and if so the DI-list will be further considered in the list expansion computation.

6. The method of claim 5, where degrees of similarities of two or more items are computed, and where degrees of relevance of the DI-lists in which the items co-occur are taken into account in the computation of the degree of similarity of the two or more items.

7. The method of claim 2, where search refiners are specified with the list of seed items or with one or more items of the list of seed items, whereby a user can use desired restrictions to be taken into account by the list expansion computation, and where the search refiners comprise one or more of the following types:
   (a) retrieval refiners, expressing restrictions on the documents to be retrieved from the document repository,
   (b) DI-list refiners, expressing restrictions on the at least one DI-List to be selected by the (g) of the list expansion computation.

8. The method of claim 2, where the document repository comprises at least one of:
   (i) the World Wide Web,
   (ii) an intranet or a federation of intranets,
   (iii) a document management system,
   (iv) an electronically searchable document or library catalog with links to online documents or to electronically stored documents,
   (v) a full-text database,
   (vi) a database that stores text fields and that can retrieve texts via a query language,
   (vii) a searchable content management system,
   (viii) a social network, where user posts are regarded as documents,
   (ix) an image repository retrievable by an image search facility retrieving images from documents, and
   (x) log management system of Web search queries,
and where the knowledge base comprises:
   (a) one or more domain-specific knowledge repositories, of which at least one comprises a rule related to the application domain,
   (b) zero or more general knowledge repositories, and
   (c) a local knowledge store holding knowledge obtained during the execution of the list expansion computation.

9. The method of claim 8, where at least one of the domain-specific knowledge repositories is selected from the group consisting of:
   (i) an enterprise knowledge graph,
   (ii) a sector-specific knowledge graph,
   (iii) a domain-specific dictionary,
   (iv) a domain-specific database,
   (v) an enterprise database,
   (vi) an enterprise data warehouse,
   (vii) an enterprise CRM system,
   (viii) a domain ontology,
   (ix) a ranking of objects or items,
   (x) a website having rankings or other domain-specific data that are accessible via at least one of:
      (a) a bespoke application programming interface,
      (b) an interactive wrapper, and
      (c) another type of data interface for the website, and
   (xi) a domain-specific social network, wherein for the domain-specific social network user profiles and links are regarded as knowledge.

10. The method of claim 8, where the knowledge base includes at least one general knowledge repository selected from the group consisting of: an online dictionary, an online encyclopedia, a general knowledge graph, a world ontology, an artificial intelligence (AI) knowledge base, and an interactive knowledge repository that is based on a language model and that can be interactively interrogated through a chat bot or an API.

11. The method of claim 8, where the knowledge base comprises at least two knowledge repositories, and where the at least two knowledge repositories are integrated by interfaces for querying and/or updating the knowledge repositories uniformly, and for exchanging knowledge in a uniform manner between the at least two knowledge repositories, and where at least two knowledge repositories are integrated by use of at least one of logical rules, database queries, and special data integration software.

12. The method of claim 2, where the facts and rules are expressed in a formalism from a group comprising at least one of:
   (i) a classical logic programming language,
   (ii) answer set programming,
   (iii) a logical database query language,
   (iv) a logical knowledge graph query language based on tuple-generating dependencies,
   (v) a database query language, where queries are regarded as rules,
   (vi) functions or conditional statements formulated in in a general-purpose programming language,
   (vii) any of (i) through (vi) syntactically and semantically extended by one or more inference features in the group consisting of: fuzzy logical inference, probabilistic inference, many-valued inference, higher-order logical inference, inference with incomplete information, uncertain inference, disjunctive inference, temporal inference, and inference with built-in generalized quantifiers,
   (viii) at least one of (i) through (vii) further extended by arithmetical and/or statistical aggregate functions, and
   (ix) at least one of (i) through (viii) further extended by interfaces to external software resources, where such interfaces can be addressed and used via special predicates,
and where the inference engine infers new facts from a set of facts and rules expressed in the formalism.

13. The method of claim 2 further comprising one or more methods of Natural Language Processing (NLP) and/or methods of data extraction whereby at least one DI-List in documents can be identified, and items in the at least one DI-List can be identified.

14. The method of claim 13, where the NLP and/or data extraction methods identify contextual information associated to the at least one DI-List and/or to items included in the at least one DI-List, and where the contextual information is used for analyzing at least one of the at least one DI-List and the items in the at least one DI-List.

15. The method of claim 14, where to each item of a group of one or more items in the at least one DI-list, the contextual information is associated, and the contextual information is used for at least one of:
(a) determining an attribute value for a known attribute of the item,
(b) associating to the item a new attribute and an attribute-value for the new attribute.

16. The method of claim 2, where the additional data being part of or related to an item in the Current List comprises data of one or more of the following types:
(i) descriptive data,
(ii) properties and attributes,
(iii) contextual data,
(iv) relational data,
(v) relevance data,
(vi) statistical data, and
(vii) metadata, and where zero or more of the additional data are displayed together with the item name to the user.

17. The method of claim 2, where a technique for item sense disambiguation is used, whereby one or more preferred senses are selected from a set of possible senses of an item, the one or more preferred senses corresponding to meanings expected to best match an intention of a user providing the list of items comprising the one or more seed items.

18. The method of claim 17 where, for discovering user intents, one or more clustering techniques are used jointly with one or more inference tasks, and where at least one inference task uses at least one application-specific rule from the knowledge base, and where one or more of:
(i) before applying the one or more clustering techniques, the objects to be clustered are labeled using the knowledge base, and the attributed labels are taken into account by one or more the clustering techniques to provide improved clustering,
(ii) clusters of items are associated with senses explicitly stored in the knowledge base,
(iii) clusters of items are associated with user intents explicitly stored in the knowledge base, and
(iv) an ontology of possible user intents is available in the knowledge base.

19. The method of claim 17, where the technique of item sense disambiguation comprises classification and/or disambiguation techniques at one or more levels from a group of levels comprising:
(i) a level of documents, whereby documents retrieved from the document repository are classified and associated with one or more topics,
(ii) a level of a DI-List, whereby the DI-List is classified according to possible senses, and
(iii) a level of single items, and where classifications are either crisp or weighted, where a weight expresses a degree of membership of an object in a class.

20. The method of claim 17, comprising one or a combination of techniques from a group of disambiguation techniques comprising:
(i) word sense disambiguation based on natural language processing (NLP) methods,
(ii) clustering techniques,
(iii) unsupervised machine-learning techniques,
(iv) rule-based disambiguation techniques,
(v) disambiguation techniques using application-specific knowledge,
(vi) disambiguation based on user interaction, and
(vii) ontology-based disambiguation techniques.

21. The method of claim 17 supported by user feedback, where users accept or reject or rate items and/or item senses presented to the users, and where the user feedback is used for disambiguation purposes.

22. The method of claim 2 where users can accept or reject or rate items from the Current List, whereby the list expansion computation gathers information about which attribute-values or other features or properties of items are desired, and which are undesired, and exploits associated knowledge during further expansion of the Current List in order to obtain items more accurately matching a user's intent.

23. The method of claim 2 where facts contained in the knowledge base or computed from the knowledge base are associated with numerical weights representing degrees of truth, and where rules of extended logic can derive weighted facts from other weighted facts.

24. The method of claim 23, where rule-based weight assignments may be circular and/or recursive, and where an overall weight assignment is expressed in and computed by a formalism comprising at least one option of:
(i) Markov networks and/or Markov
(ii) Probabilistic Soft Logic (PSL),
(iii) ProbLog,
(iv) Multivalued Datalog (MV Datalog), and
(v) an extension or variant of the at least one option.

25. The method of claim 2, where, in addition, the items of the final expanded item list are used for enriching a knowledge graph.

26. The method of claim 2, where one or more facts, rules, or data relations contained in the knowledge base are learned via machine-learning or statistical methods from a database or dataset, and where at least one of the learned facts is used by the inference engine for contributing to a task being part of the list expansion computation, thereby amalgamating (i) machine learning or statistical learning with (2) logical inference in the list expansion computation.

27. The method of claim 2, where a similarity relation between items or between attribute values associated with items was learned from a database or dataset, and where the similarity relation is used by the the item set expansion method.

28. The method of claim 2, where for each document analyzed in (e), an index data structure (IDS) is associated with the document, the IDS containing relevant information related to the analysis performed by (i) of the DI-List of the document that were selected by (i), whereby all or part of the analysis can be saved for future applications, thereby avoiding re-computation of the analysis.

29. A system comprising:
a computing device having a memory and at least one processor to execute instructions stored on the memory to perform operations comprising:
receiving a list of seed items belonging to a same application domain; and
expanding the list of seed items to include items that:
(i) are similar or related to seed items, and
(ii) co-occur with one or more seed items or and/or one or more already computed further items in one or more lists of items, comprising "Document Item Lists" ("DI-Lists"), each being part of an electronic document from a computer-retrievable electronic document repository, and
(iii) are selected by a process involving statistical evaluations and processing of factual knowledge and rule-based knowledge, the rule-based knowledge involving one or more rules expressing application-domain specific knowledge;

the operations further comprising:
(1) accessing a knowledge base, the knowledge base storing in permanent and/or non-transitory memory facts and rules, the knowledge base comprising a plurality of application-domain specific facts, and zero or more application-domain independent facts, one or more application-domain specific rules related to the application domain, and zero or more application-domain independent ("general") rules,
(2) inferring new facts from a given set of facts using an inference engine that uses at least one rule from the knowledge base, and
(3) expressing items, relationships among items, and relationships between items and their attributes as facts, where
(i) the facts are represented as logical atoms and/or as relational data tuples that are interpreted by the inference engine as logical atoms, and/or as data structures in a programming language that are interpreted by the inference engine as logical atoms,
(ii) the rules represent logical inference rules having a rule body and a rule head,
(iii) all seed items have a type, known as "Input Item Type", and
(iv) the document repository comprises a search functionality which, for a given set of items searches and retrieves documents containing these items.

30. A non-transitory computer-readable storage medium, having instructions stored thereon that, when executed by a computing device cause the computing device to perform operations, the operations comprising:

receiving a list of seed items belonging to a same application domain; and
expanding the list of seed items to include items that:
(i) are similar or related to seed items, and
(ii) co-occur with one or more seed items or and/or one or more already computed further items in one or more lists of items, comprising "Document Item Lists" ("DI-Lists"), each being part of an electronic document from a computer-retrievable electronic document repository, and
(iii) are selected by a process involving statistical evaluations and processing of factual knowledge and rule-based knowledge, the rule-based knowledge involving one or more rules expressing application-domain specific knowledge;

the operations further comprising:
(1) accessing a knowledge base, the knowledge base storing in permanent and/or non-transitory memory facts and rules, the knowledge base comprising a plurality of application-domain specific facts, and zero or more application-domain independent facts, one or more application-domain specific rules related to the application domain, and zero or more application-domain independent ("general") rules,
(2) inferring new facts from a given set of facts using an inference engine that uses at least one rule from the knowledge base, and
(3) expressing items, relationships among items, and relationships between items and their attributes as facts, where
(i) the facts are represented as logical atoms and/or as relational data tuples that are interpreted by the inference engine as logical atoms, and/or as data structures in a programming language that are interpreted by the inference engine as logical atoms,
(ii) the rules represent logical inference rules having a rule body and a rule head,
(iii) all seed items have a type, known as "Input item Type", and
(iv) the document repository comprises a search functionality which, for a given set of items searches and retrieves documents containing these items.

* * * * *